(12) United States Patent
Watariuchi

(10) Patent No.: US 12,355,926 B2
(45) Date of Patent: Jul. 8, 2025

(54) IMAGE PROCESSING APPARATUS DISPLAYS SETTING SCREEN FOR FUNCTION CORRESPONDING TO JOB INFORMATION RECEIVED FROM EXTERNAL TERMINAL, METHOD OF CONTROLLING IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Satoki Watariuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/947,325

(22) Filed: Sep. 19, 2022

(65) Prior Publication Data
US 2023/0102714 A1      Mar. 30, 2023

(30) Foreign Application Priority Data
Sep. 29, 2021   (JP) ................................. 2021-159184

(51) Int. Cl.
H04N 1/00        (2006.01)
G06F 3/12        (2006.01)

(52) U.S. Cl.
CPC ..... *H04N 1/00482* (2013.01); *H04N 1/00204* (2013.01); *H04N 1/00408* (2013.01); *G06F 3/1255* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS 11,656,817 B2 * 5/2023 Dohmae ............... G06F 3/1222
                                                                        358/1.14
2011/0135322 A1    6/2011  Masuyama
(Continued)

FOREIGN PATENT DOCUMENTS

JP      2007318360 A    12/2007
JP      2010269563 A    12/2010
(Continued)

OTHER PUBLICATIONS

Examination Report issued in Indian Appln. No. 202244055231, mailed Sep. 11, 2023.

*Primary Examiner* — Haris Sabah
(74) *Attorney, Agent, or Firm* — ROSSI, KIMMS & McDOWELL LLP

(57) ABSTRACT

An image processing apparatus includes a memory and at least one processor in communication with the memory, wherein the at least one processor of the image processing apparatus is configured to receive job information for giving an instruction to execute a function of the image processing apparatus from an external terminal, perform display control such that a setting screen for the function corresponding to the job information is displayed, based on the reception of the job information, and execute the function based on the received job information.

12 Claims, 22 Drawing Sheets

(56) References Cited

U.S. PATENT DOCUMENTS

| | | | | |
|---|---|---|---|---|
| 2014/0078549 A1* | 3/2014 | Amiya | ............... | H04N 1/00411 |
| | | | | 358/1.15 |
| 2015/0312434 A1* | 10/2015 | Tagaki | ............... | H04N 1/00973 |
| | | | | 358/1.15 |
| 2015/0339561 A1* | 11/2015 | Takenaka | .............. | G06F 3/1238 |
| | | | | 358/1.14 |
| 2017/0149986 A1* | 5/2017 | Kasuya | .............. | H04N 1/32496 |
| 2017/0269886 A1* | 9/2017 | Ozawa | .................... | A61B 5/02 |
| 2019/0289148 A1 | 9/2019 | Utoh | | |
| 2019/0361635 A1* | 11/2019 | Kawanishi | ............ | G06F 3/1257 |
| 2020/0036845 A1* | 1/2020 | Kondo | ............... | H04N 1/00498 |
| 2022/0366023 A1* | 11/2022 | Nakagoshi | ............ | G06F 21/608 |

FOREIGN PATENT DOCUMENTS

| JP | 2013232085 A | 11/2013 |
|---|---|---|
| JP | 2014176023 A | 9/2014 |
| JP | 2014230044 A | 12/2014 |
| JP | 2021016952 A | 2/2021 |

* cited by examiner

FIG. 6

| 601 | 602 | 603 | 604 | 605 | 606 | 607 | 608 |
|---|---|---|---|---|---|---|---|
| AUTHENTICATION SETTING | AUTHENTICATION STATE | EXECUTION STEP | PROCESSING | PARAMETER | EXECUTION CONDITION | AUTOMATIC TRANSITION | USER OPERATION |
| NO AUTHENTICATION | – | 0 | SCREEN CHECK | HOME SCREEN, JOB SITUATION SCREEN, MOBILE PORTAL SCREEN | – | YES | – |
| | | 1 | SCREEN DISPLAY | JOB EXECUTION REQUEST: EXECUTION TARGET APPLICATION | – | YES | – |
| | | 2 | JOB EXECUTION | JOB EXECUTION REQUEST: JOB SETTING | – | YES | – |

| | 601 | 602 | 603 | 604 | 605 | 606 | 607 | 608 |
|---|---|---|---|---|---|---|---|---|
| | AUTHENTICATION SETTING | AUTHENTICATION STATE | EXECUTION STEP | PROCESSING | PARAMETER | EXECUTION CONDITION | AUTOMATIC TRANSITION | USER OPERATION |
| 614 | AUTHENTICATED/ DISPLAY LOGIN SCREEN WHEN OPERATION IN DEVICE IS STARTED | AUTHENTICATED | 0 | SCREEN CHECK | HOME SCREEN, JOB SITUATION SCREEN, MOBILE PORTAL SCREEN | --- | YES | --- |
| 615 | | | 1 | SCREEN DISPLAY | JOB EXECUTION REQUEST: EXECUTION TARGET APPLICATION | --- | YES | --- |
| 616 | | | 2 | JOB EXECUTION | JOB EXECUTION REQUEST: JOB SETTING | --- | YES | --- |
| 617 | | UNAUTHENTICATED | 0 | SCREEN CHECK | LOGIN SCREEN, JOB SITUATION SCREEN | --- | YES | --- |
| 618 | | | 1 | SCREEN DISPLAY | LOGIN SCREEN | SCREEN DURING DISPLAY! = LOGIN SCREEN | YES | --- |
| 619 | | | 2 | LOGIN | JOB EXECUTION REQUEST: LOGIN INFORMATION | --- | YES | --- |
| 620 | | | 3 | LANGUAGE SWITCHING | SETTING OF LOGIN USER: DISPLAY LANGUAGE | CURRENT DISPLAY LANGUAGE! = DISPLAY LANGUAGE OF LOGIN USER | YES | --- |
| 621 | | | 4 | SCREEN DISPLAY | NOTICE SCREEN | NOTICE SCREEN DISPLAY SETTING==ON | NO | CLOSE SCREEN, TRANSITION TO INITIAL SCREEN, TRANSITION TO EXECUTION TARGET APPLICATION |
| 622 | | | 5 | SCREEN DISPLAY | SETTING OF LOGIN USER: INITIAL SCREEN | (SCREEN DURING DISPLAY!= INITIAL SCREEN OF LOGIN USER) AND (SCREEN DURING DISPLAY!= EXECUTION TARGET APPLICATION) | YES | --- |
| 623 | | | 6 | SCREEN DISPLAY | JOB EXECUTION REQUEST: EXECUTION TARGET APPLICATION | SCREEN DURING DISPLAY! = EXECUTION TARGET APPLICATION | YES | --- |
| 624 | | | 7 | JOB EXECUTION | JOB EXECUTION REQUEST: JOB SETTING | --- | YES | --- |

FIG. 8

| | 601 AUTHENTICATION SETTING | 602 AUTHENTICATION STATE | 603 EXECUTION STEP | 604 PROCESSING | 605 PARAMETER | 606 EXECUTION CONDITION | 607 AUTOMATIC TRANSITION | 608 USER OPERATION |
|---|---|---|---|---|---|---|---|---|
| 625 | AUTHENTICATED/ DISPLAY LOGIN SCREEN WHEN FUNCTION REQUIRED TO BE AUTHENTICATED IS SELECTED | AUTHENTICATED | 0 | SCREEN CHECK | HOME SCREEN, JOB SITUATION SCREEN, MOBILE PORTAL SCREEN | - | YES | - |
| 626 | | | 1 | SCREEN DISPLAY | JOB EXECUTION REQUEST: EXECUTION TARGET APPLICATION | - | YES | - |
| 627 | | | 2 | JOB EXECUTION | JOB EXECUTION REQUEST: JOB SETTING | - | YES | - |
| 628 | | UNAUTHENTICATED | 0 | SCREEN CHECK | HOME SCREEN, JOB SITUATION SCREEN, MOBILE PORTAL SCREEN | - | YES | - |
| 629 | | | 1 | SCREEN DISPLAY | LOGIN SCREEN | - | YES | - |
| 630 | | | 2 | LOGIN | JOB EXECUTION REQUEST: LOGIN INFORMATION | - | YES | - |
| 631 | | | 3 | LANGUAGE SWITCHING | SETTING OF LOGIN USER: DISPLAY LANGUAGE | CURRENT DISPLAY LANGUAGE != DISPLAY LANGUAGE OF LOGIN USER | YES | - |
| 632 | | | 4 | SCREEN DISPLAY | JOB EXECUTION REQUEST: LOGIN INFORMATION | - | YES | - |
| 633 | | | 5 | JOB EXECUTION | JOB EXECUTION REQUEST: JOB SETTING | - | YES | - |

IMAGE PROCESSING APPARATUS DISPLAYS SETTING SCREEN FOR FUNCTION CORRESPONDING TO JOB INFORMATION RECEIVED FROM EXTERNAL TERMINAL, METHOD OF CONTROLLING IMAGE PROCESSING APPARATUS, AND NON-TRANSITORY COMPUTER-READABLE STORAGE MEDIUM

BACKGROUND OF THE INVENTION

Field of the Invention

The present invention relates to an image processing apparatus that executes a job by wirelessly communicating with a data processing device, a method of controlling the image processing apparatus, and a storage medium.

Description of the Related Art

In recent years, with the spread of high-performance mobile terminals called smartphones, applications that use image processing apparatuses from the mobile terminals (data processing devices) have been provided. For example, in the execution of a function of transmitting a scanned manuscript to a designated address, an image processing apparatus on a LAN is searched for, and a transmission destination mail address, various scanning setting information (for example, color, double-sided) which are set by a user are added, thereby generating a transmission job. By transmitting the generated transmission job to the found image processing apparatus having a transmission function, it is possible to instruct a mobile terminal to execute a series of processes of the image processing apparatus which are required for transmission. At this time, network communication between the mobile terminal and the image processing apparatus is established in accordance with a communication protocol such as TCP/IP, NFC, Bluetooth (registered trademark) and can be realized by a known technique. Note that an image processing apparatus of the related art has various functions such as a scanning function, a printing function, a copy function, a network function, and a fax transmission and reception function.

In Japanese Patent Laid-Open No. 2013-232085, job setting is performed on a client terminal such as a mobile terminal, and job settings are transmitted from the client terminal to an image processing apparatus. Thereby, even an image processing apparatus that does not include an operation panel or an image processing apparatus including a small operation panel can also execute a job.

On the other hand, many image processing apparatuses include a large operation panel in order to improve user operability. With a large operation panel, the range of expression is widened, and thus, for example, a job execution situation can be displayed to a user in an easy-to-understand manner.

In the related art, when a job is executed from the client terminal, the display of an operation panel of the client terminal is different from in a case where a job is executed using the operation panel of the image processing apparatus. For this reason, there is a problem that it is difficult to understand what is being executed in the image processing apparatus.

An image processing apparatus including an operation panel basically performs settings using the operation panel and displays an execution situation on the operation panel. A case where a job is executed using the operation panel of the image processing apparatus is generally accompanied with a plurality of operations before the job is executed. For example, login is performed, an application for executing a job is activated, the setting of the job is performed, and the job is executed. On the other hand, in a case where a job is executed by a client terminal (external terminal), the job is executed without displaying those steps on the operation panel of the image processing apparatus, which causes confusion for a user and a concern that usability may be reduced.

SUMMARY OF THE INVENTION

The present invention is contrived in view of the above-described problem, and provides an image processing apparatus that does not reduce usability even when an instruction for executing a job is given from an external terminal.

In order to achieve the above-described object, the present invention provides an image processing apparatus including a memory, and at least one processor in communication with the memory, in which the at least one processor of the image processing apparatus is configured to receive job information for giving an instruction to execute a function of the image processing apparatus from an external terminal, perform display control such that a setting screen for the function corresponding to the job information is displayed, based on the reception of the job information, and execute the function based on the received job information.

Further features of the present invention will become apparent from the following description of exemplary embodiments (with reference to the attached drawings).

BRIEF DESCRIPTION OF THE DRAWINGS

FIG. 6 is a diagram illustrating an example of an automatic control management table in a first embodiment.

FIG. 7 is a diagram illustrating an example of the automatic control management table in the first embodiment.

FIG. 8 is a diagram illustrating an example of the automatic control management table in the first embodiment.

DESCRIPTION OF THE EMBODIMENTS

Hereinafter, exemplary embodiments for carrying out the present invention will be described in detail with reference to the drawings. However, components described in the embodiments are merely examples, and the scope of the present invention is not limited thereto.

First Embodiment

Figure 1:
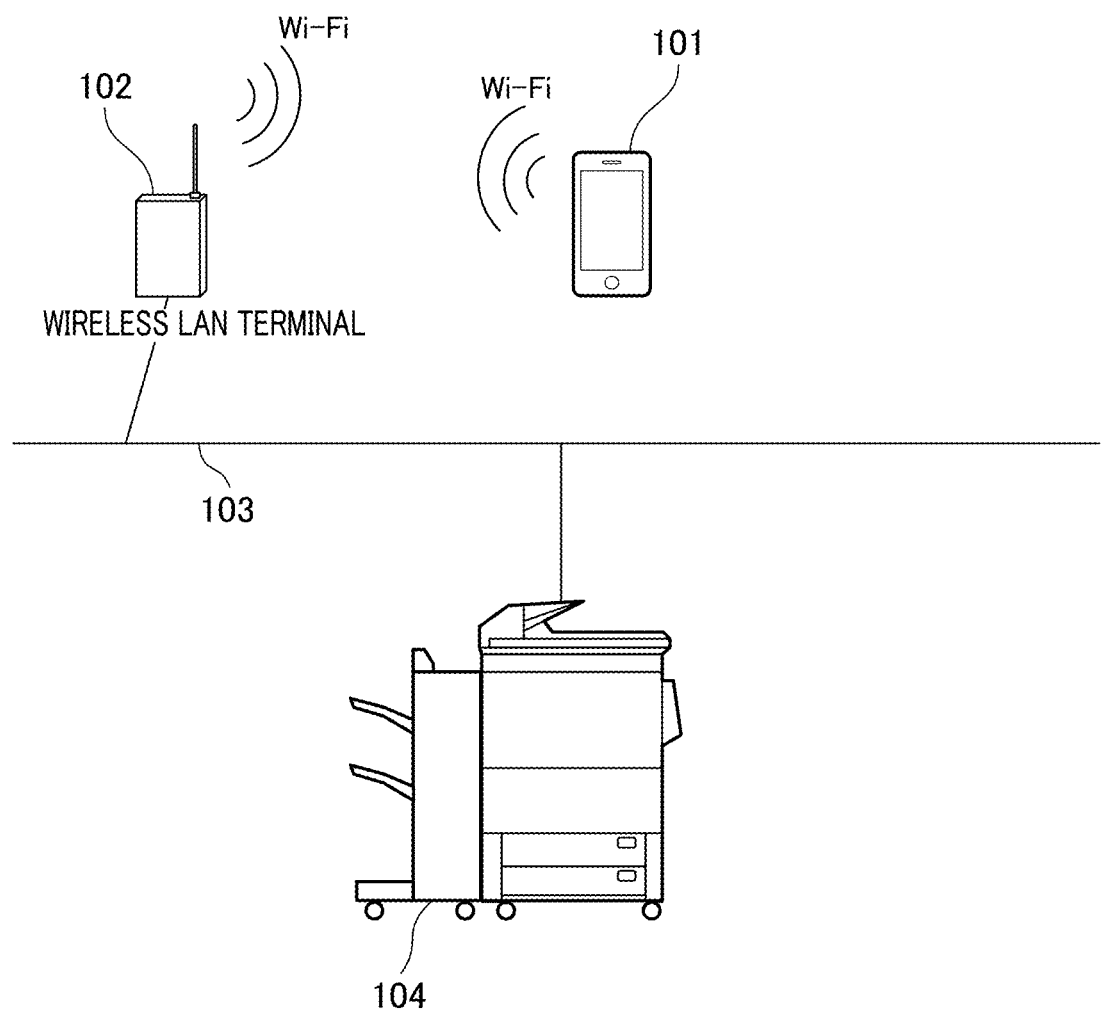
FIG. 1 is a block diagram illustrating a configuration of a data processing system.

FIG. 1 is a block diagram illustrating a configuration of a data processing system. A data processing system 100 includes a data processing device 101, a wireless LAN terminal 102, and an image processing apparatus 104, which are connected to each other through a network 103.

The data processing device 101 is a client terminal for operating the image processing apparatus 104. In the present embodiment, a mobile terminal such as a smartphone is described as an example, but a personal computer may be used. In addition, the data processing device 101 is connected to the network 103 by the wireless LAN terminal 102. In this manner, the data processing device 101 in the present embodiment functions as an external terminal of the image processing apparatus 104.

The wireless LAN terminal 102 is a master unit of a wireless LAN having a general network router function. The wireless LAN terminal 102 provides a wireless LAN via Wi-Fi in a home, an office, or the like.

The image processing apparatus 104 is a digital multi-function device having various job execution functions such as a printer function, a copy function, a scanner function, and a fax transmission function. The image processing apparatus 104 is also called a multi-function peripheral (MFP). A user can operate the data processing device 101 to instruct the image processing apparatus 104 to execute a job and can execute various functions of the image processing apparatus 104. In addition, the data processing device 101 and the image processing apparatus 104 can perform short-range radio communication through a wireless signal such as near field communication (NF) or Bluetooth low energy (BLE).

Figure 2:
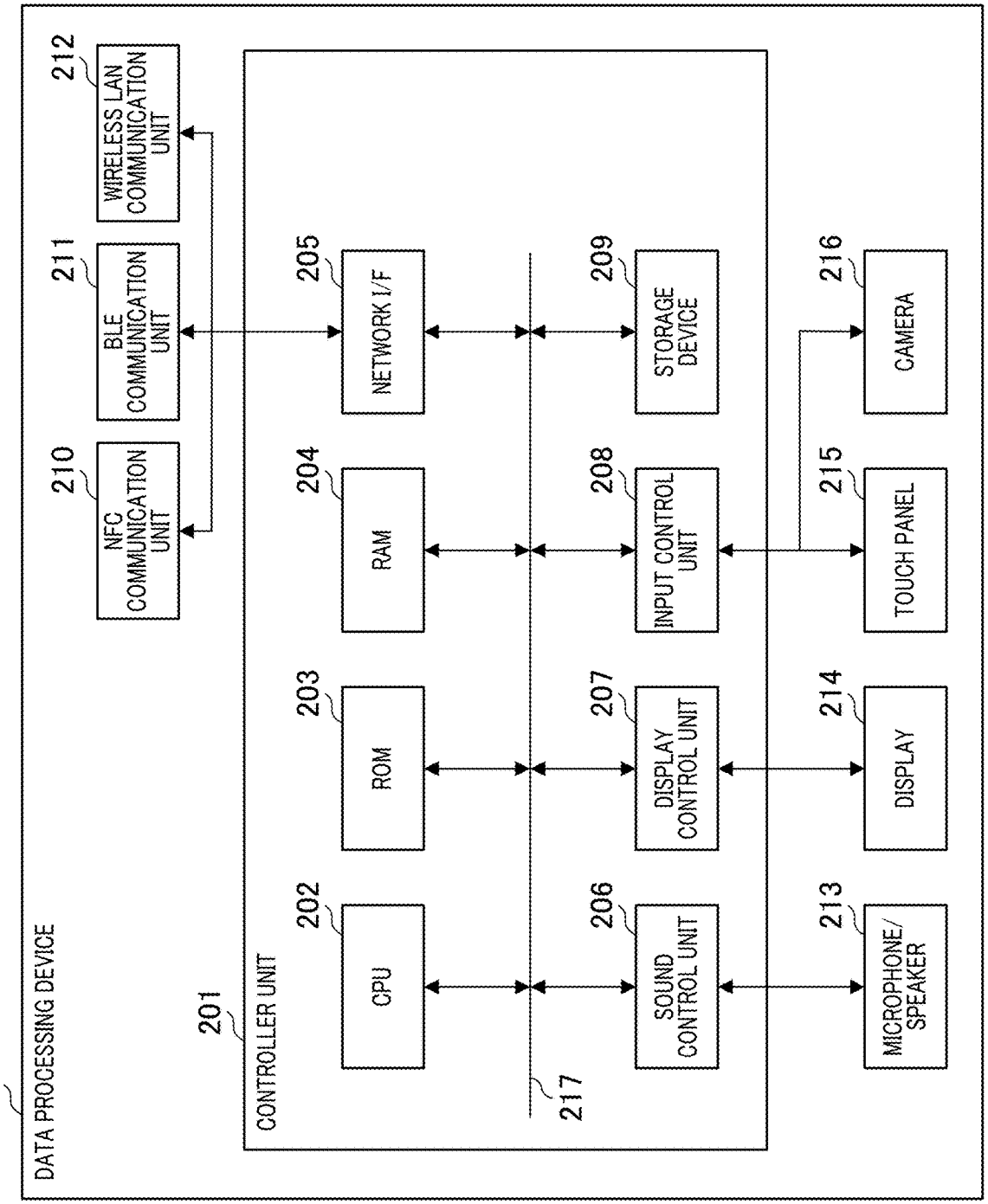
FIG. 2 is a block diagram illustrating a hardware configuration of a data processing device.

FIG. 2 is a block diagram illustrating a hardware configuration of the data processing device 101. The data processing device 101 includes a controller unit 201.

The controller unit 201 controls various communication units such as an NFC communication unit 210, a BLE communication unit 211, and a wireless LAN communication unit 212. In addition, the controller unit 201 controls various UI units such as a microphone/speaker 213, a display 214, and a touch panel 215, and a camera 216.

The controller unit 201 includes a CPU 202, a ROM 203, a RAM 204, a network I/F 205, a sound control unit 206, a display control unit 207, an input control unit 208, and a storage device 209. The units are connected to each other by a system bus 217.

The CPU 202 controls the entire system of the data processing device 101. Various programs are executed by the CPU 202. The ROM 203 stores an operating system of the data processing device 101 and an application for controlling a call and data communication. The RAM 204 is a memory for the CPU 202 to execute various programs and is a work memory area for an application to execute the programs. The network I/F 205 is connected to the NFC communication unit 210, the BLE communication unit 211, and the wireless LAN communication unit 212 and controls various wireless communication with the image processing apparatus 104. The sound control unit 206 controls the input and output of sound data through the microphone/speaker 213. The display control unit 207 controls the output of image data displayed on the display 214. The input control unit 208 controls the input of information for which an instruction is given by a user through a button or the touch panel 215 and controls the input of image data through the camera 216. Various applications executed in the data processing device 101 are provided to the user by using the sound control unit 206, the display control unit 207, and the input control unit 208. In the storage device 209 which is a non-volatile storage device, various operation mode settings, an operation log, and the like required to be held even after the data processing device 101 is started up again are recorded.

Figure 3:
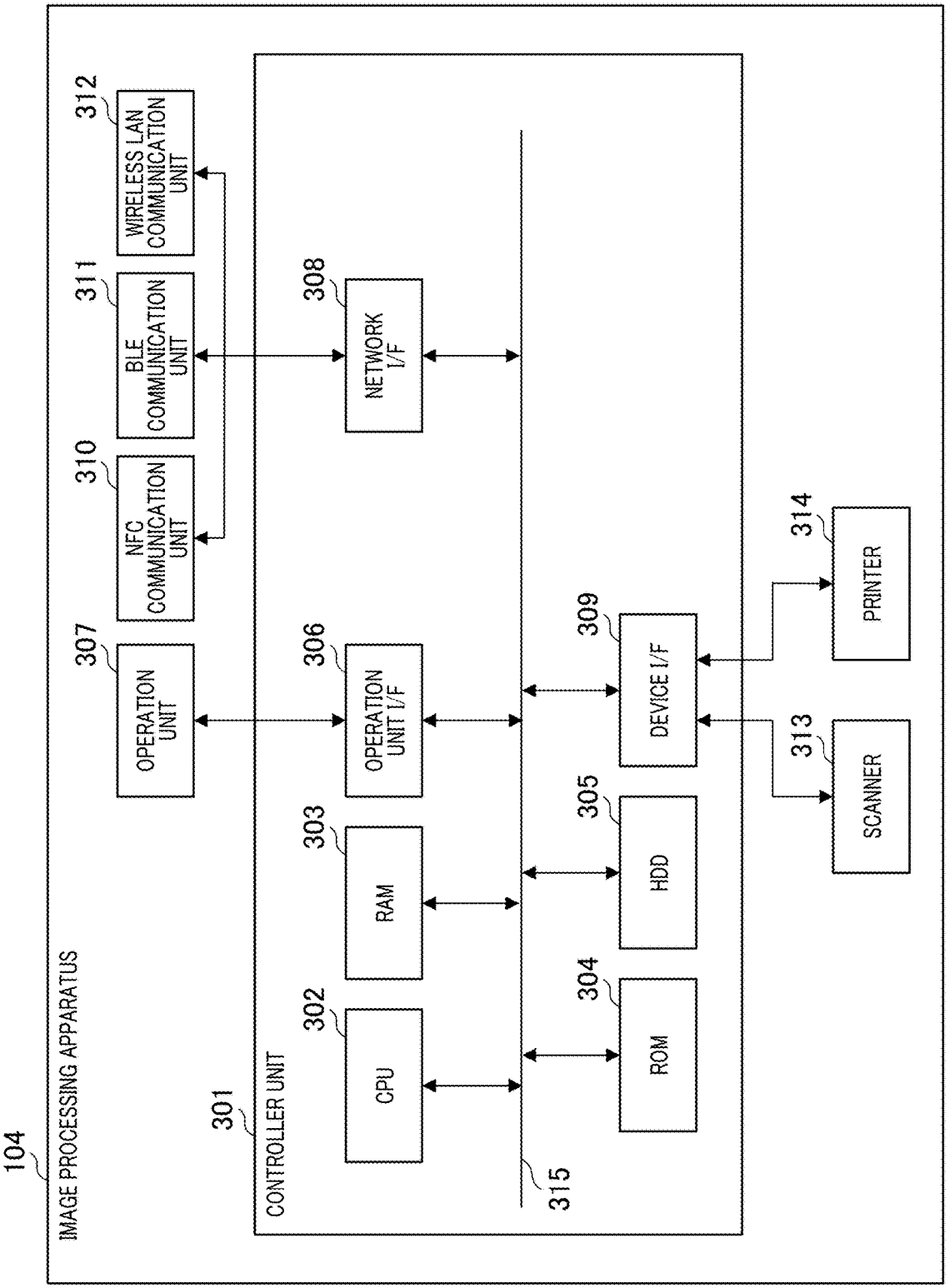
FIG. 3 is a block diagram illustrating a hardware configuration of an image processing apparatus.

FIG. 3 is a block diagram illustrating a hardware configuration of the image processing apparatus 104. The image processing apparatus 104 includes a controller unit 301, and the controller unit 301 controls various communication units such as an NFC communication unit 310, a BLE communication unit 311, and a wireless LAN communication unit 312. In addition, the image processing apparatus 104 controls an operation unit 307, a scanner 313, and a printer 314.

In a case where the user uses a copy function, the controller unit 301 controls the scanner 313 to acquire image data of a manuscript and controls the printer 314 to print an image on a sheet and output the image. Further, in a case where the user uses a scanning function, the controller unit 301 controls the scanner 313 to acquire image data of a manuscript and convert the image data into code data, and transmits the code data to the data processing device 101 through the network 103. Further, in a case where the user uses a printing function, the controller unit 301 receives printing data from the data processing device 101 through the network 103. The received printing data is converted into image data and transmitted to the printer 314, and an image is printed on a sheet based on the image data and is output. In addition, the image processing apparatus 104 also has a fax reception function of receiving data from an ISDN or the like and printing the data and a fax transmission function of transmitting scanned data to the ISDN or the like. An instruction for executing processing in each of the functions is called a job, and the image processing apparatus 104 executes predetermined processing in accordance with a job corresponding to each function.

The controller unit 301 includes a CPU 302, a RAM 303, a ROM 304, an HDD 305, an operation unit I/F 306, a network I/F 308, and a device I/F 309, which are connected to each other by a system bus 315.

The CPU 302 controls the entire system of the image processing apparatus 104. The RAM 303 is a system work memory for the CPU 302 to operate, and is an image memory for temporarily storing image data. In addition, the RAM 303 also stores programs such as an operating system, system software, and application software, and data. In addition, the RAM 303 stores scanned image data read by the scanner 313 and stores printing data received from the data processing device 101 through the network 103. The ROM 304 is configured to store a boot program of the system. The hard disk drive (HDD) 305 is configured to store an operating system, system software, application software, printing data, setting data, and the like. The operation unit IT 306 is an interface unit for the operation unit 307, and outputs information to be displayed on the operation unit 307 to the operation unit 307. In addition, the operation unit I/F 306 receives information input by the user from the operation unit 307.

The operation unit 307 is a touch panel type operation panel that allows the user to perform operation while visually recognizing the content of an instruction by displaying a message or a button on a screen. However, all operations through the operation unit 307 do not need to be performed in the operation panel, and the operation unit 307 may be configured to partially have a portion that can be operated by a physical button or the like. The operation unit 307 of the present embodiment is an example of operation means for giving an instruction for executing a job corresponding to the function of the image processing apparatus 104. In addition, the operation unit 307 functions as display means for presenting information to the user.

The network I/F 308 is connected to the NFC communication unit 310, the BLE communication unit 311, and the wireless LAN communication unit 312 and controls various wireless communication with the data processing device 101. The NFC communication unit 310 and the BLE communication unit 311 form short-range radio communication with the data processing device 101 through a wireless signal. The wireless LAN communication unit 312 forms a wireless LAN together with the data processing device 101 through the network 103. In this manner, the network I/F 308 in the present embodiment functions as reception means for receiving a job instruction and user information from the data processing device 101. The image processing apparatus 104 performs data communication with the data processing device 101 through the network I/F 308 and receives commands for executing various functions of the image processing apparatus 104 to execute a job.

The device I/F 309 connects the scanner 313 and the printer 314 which execute reading and printing of image data, and the controller unit 301 to input and output the image data.

Figure 4:
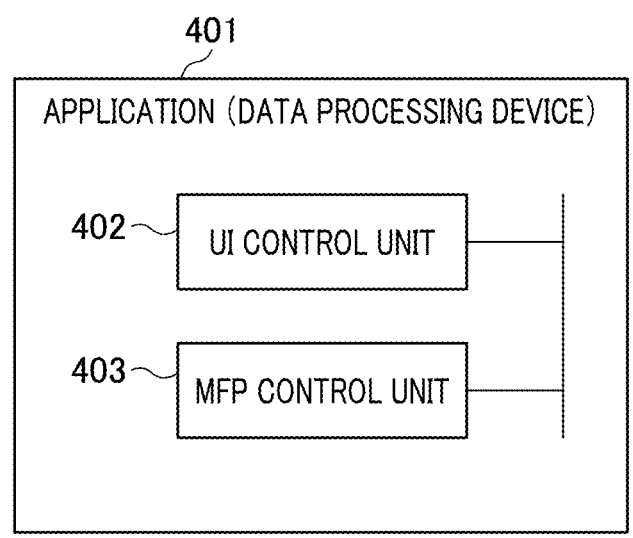
FIG. 4 is a block diagram illustrating a software configuration of the data processing device.

FIG. 4 is a block diagram illustrating a software configuration of the data processing device 101. An application 401 is software executed by the CPU 202 of the data processing device 101 and is stored in the ROM 203. The application 401 includes a UI control unit 402 and an MFP control unit 403.

The UI control unit 402 controls a user interface (UI). The UI control unit 402 receives setting information of a job which is input by the user through the touch panel 215 and connection information of the image processing apparatus 104, and transmits the received information to the MFP control unit 403. In addition, the UI control unit 402 receives a response from the MFP control unit 403 and outputs the received response to the display 214 through the display control unit 207.

The MFP control unit 403 transmits a request to the image processing apparatus 104 and receives a response from the image processing apparatus 104. The MFP control unit 403 generates job execution instruction information from job settings received by the UI control unit 402 and transmits a job execution request to the image processing apparatus 104 through the network 103. In addition, the MFP control unit 403 acquires a job execution situation from the image processing apparatus 104 through the network 103 and transmits the acquired job execution situation to the UI control unit 402.

Figure 5:
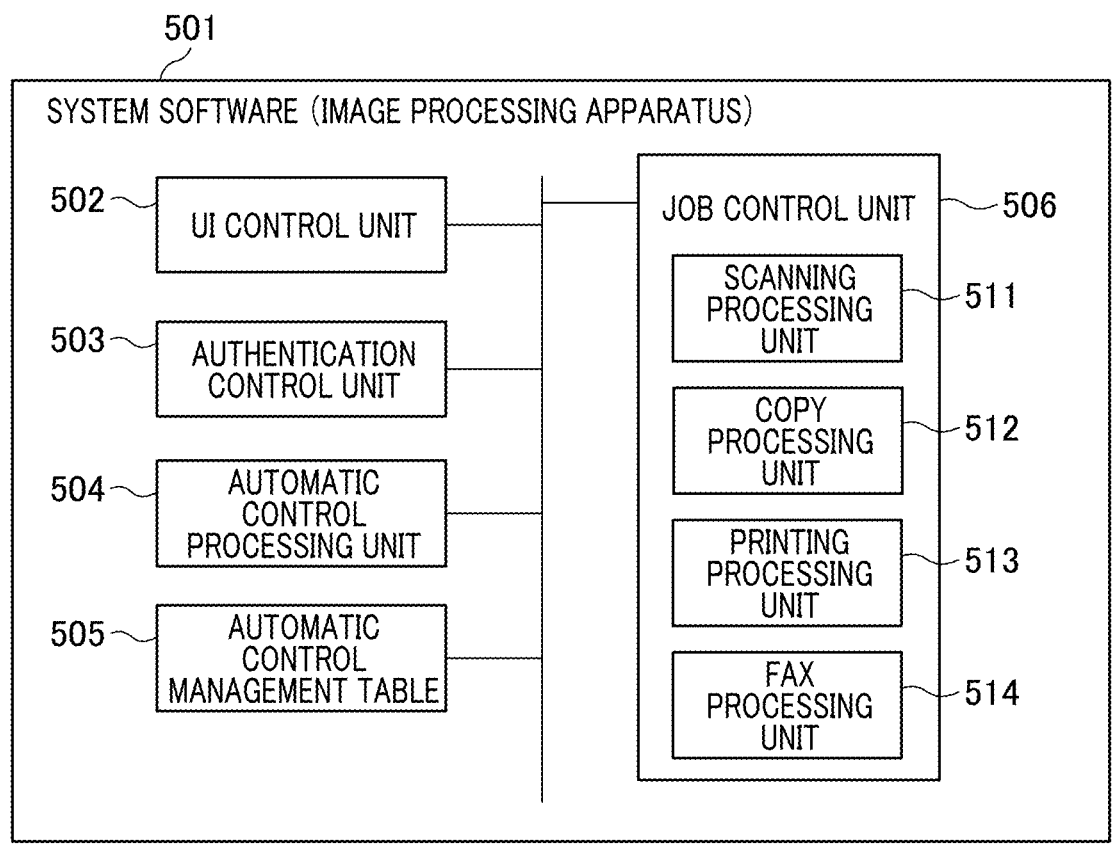
FIG. 5 is a block diagram illustrating a software configuration of the image processing apparatus.

FIG. 5 is a block diagram illustrating a software configuration of the image processing apparatus 104. A system software 501 is software executed by the CPU 302 of the image processing apparatus 104 and is stored in the RAM 303. The system software 501 includes a UI control unit 502, an authentication control unit 503, an automatic control processing unit 504, an automatic control management table 505, and a job control unit 506.

The UI control unit 502 receives information which is input by the user through the operation unit 307 and performs the control of the screen of the operation unit 307, and the like. The authentication control unit 503 performs user authentication processing based on authentication information received from the data processing device 101 and returns the results thereof. The UI control unit 502 in the present embodiment functions as display control means for performing display control such as the determination of a display content and a screen transition content in the screen of the operation unit 307 in a case where the image processing apparatus 104 has received a job.

The automatic control processing unit 504 performs automatic control of the image processing apparatus 104 based on a request received from the data processing device 101. Here, the automatic control is to define a series of processes including a combination of a plurality of processes in advance and execute the processes continuously. The automatic control processing unit 504 in the present embodiment functions as execution means for executing the function of the image processing apparatus 104 based on a job for which an instruction has been given by the operation unit 307 or a job received by the network I/F 308.

The automatic control management table 505 is a table for the automatic control processing unit 504 to manage information required to perform automatic control of the image processing apparatus 104. For this reason, the automatic control management table 505 functions as execution procedure determination means for determining a job execution procedure in accordance with any one or both of the setting and the state of the image processing apparatus 104. The job control unit 506 controls processing units such as a scanning processing unit 511, a copy processing unit 512, a printing processing unit 513, and a fax processing unit 514 in accordance with job setting in the automatic control management table 505 and executes various jobs.

FIGS. 6 to 8 are diagrams illustrating an example of the automatic control management table 505 in the first embodiment. The automatic control management table 505 illustrated in FIGS. 6, 7, and 8 is an integrated table. The automatic control management table 505 defines combination conditions of authentication setting and an authentication state of the image processing apparatus 104, and each processing of automatic control performed by the image processing apparatus 104 in a case where the combination conditions are satisfied. The automatic control is constituted by a plurality of steps, and the automatic control management table 505 defines processing performed by one row in one step.

An authentication setting column 601 is a column that represents authentication setting of the image processing apparatus 104. An authentication state column 602 is a column that represents an authentication state of the image processing apparatus 104. Automatic control to be performed is determined by a combination of the authentication setting column 601 and the authentication state column 602.

An execution step column 603 defines the order of processing of automatic control. The processing is performed in ascending order of the number. Execution step 0 is a special step and defines processing for performing a check for determining whether or not automatic control can be started. In a case where it is determined in Execution step 0 that automatic control can be performed, the subsequent execution steps are performed.

A processing column 604 defines processing performed in each execution step. Examples of the processing include screen check processing, screen display processing, job execution processing, login processing, language switching processing, and the like. Note that the content of the processing is not limited thereto.

A parameter column 605 defines parameters given at the time of performing the processing defined in the processing column 604. The parameters specify specific contents of each processing and information used in each processing.

An execution condition column 606 defines a condition for performing each execution step. A step having an execution condition of "–" is performed at all times. An execution step in which a specific condition is defined for an execution condition is performed only when the condition is satisfied, and the execution step proceeds to the next execution step without being performed when the condition is not satisfied. In this manner, the automatic control management table 505 defines that each procedure regarding a job is executed or skipped based on the execution condition.

An automatic transition column 607 defines whether or not to automatically perform an execution step without a user's operation. In an execution step in which an automatic transition is "YES", the processing of the next execution step is automatically performed when the defined processing is performed. In an execution step in which an automatic transition is "NO", the defined processing is performed, and then the user's operation is waited for. In this manner, in a case where a procedure for not automatically executing a job is determined based on an execution condition in the automatic control management table 505, the automatic control processing unit 504 does not automatically execute a job.

A user operation column 608 defiles the user's operation to be waited for after performing an execution step in which an automatic transition is "NO". When an operation performed by the user is in the range of the operation defined in the user operation column 608 after performing the execution step in which an automatic transition is "NO", the next execution step is performed, and otherwise automatic control is stopped.

Figure 9:
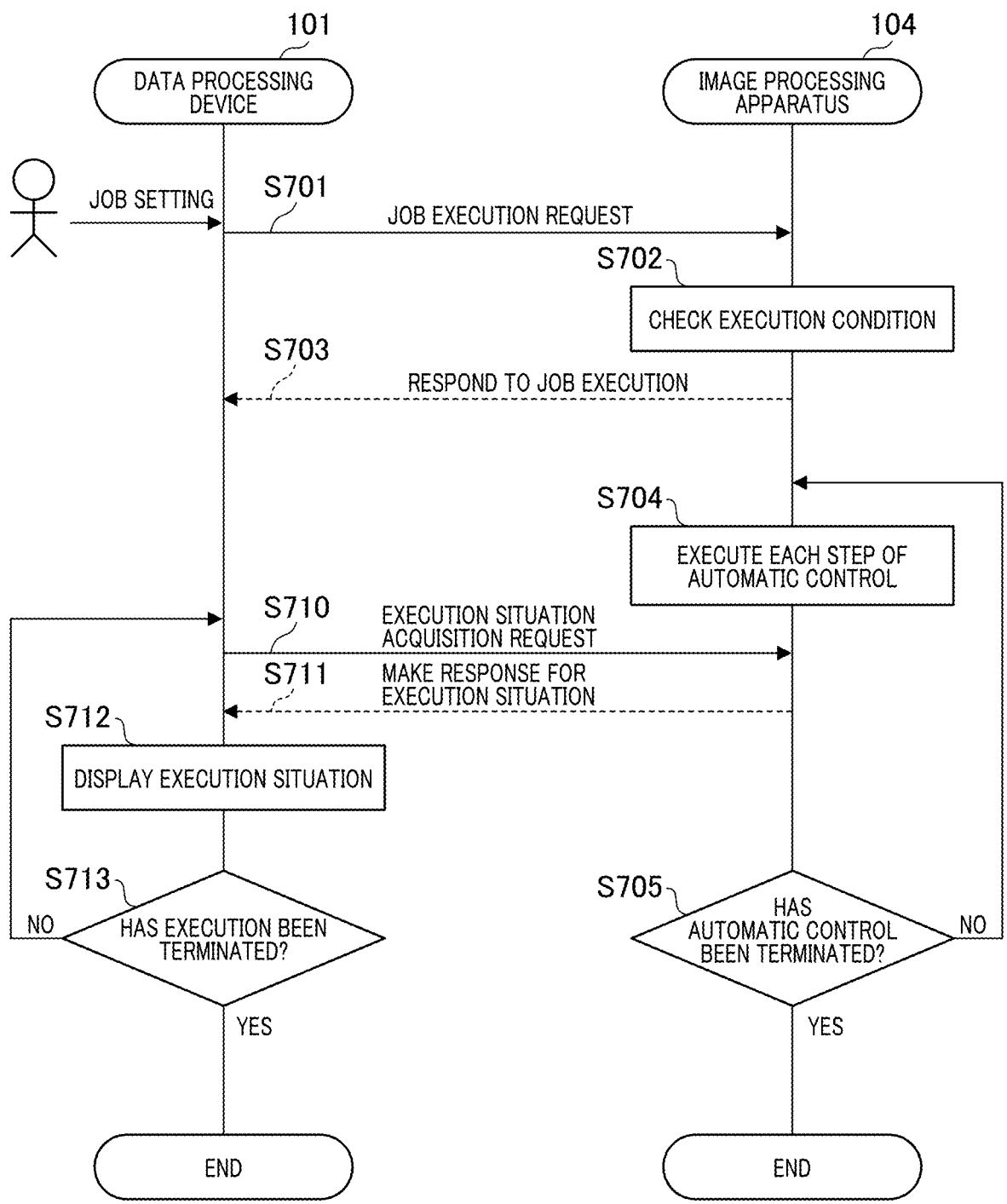
FIG. 9 is a sequence diagram illustrating a flow of the entire data processing system in the first embodiment.

FIG. 9 is a sequence diagram illustrating a flow of the entire data processing system in the first embodiment. Specifically, FIG. 9 is a sequence diagram for explaining an exchange between the data processing device 101 and the image processing apparatus 104. In step S701, the data processing device 101 transmits a job execution request including a job setting value which is input by the user to the image processing apparatus 104.

In step S702, the image processing apparatus 104 checks whether or not the job execution request received from the data processing device 101 can be executed. In step S703, results of the check in step S702 are transmitted to the data processing device 101 as a response to the job execution request.

In step S704, the image processing apparatus 104 executes processing of each execution step of automatic control. In step S705, the image processing apparatus 104 determines whether or not the execution step of automatic control has been executed up to the final step. In a case where the execution step has been completed up to the final step, the processing is terminated. On the other hand, in a case where the execution step has not been completed up to the final step, the processing returns to step S704 to execute processing of the next execution step.

Next, processing from step S710 to step S713 will be described. Processing after step S710 is processing for displaying an execution situation of the image processing apparatus 104 in the data processing device 101 and is processing in which the data processing device 101 inquires an execution situation of the image processing apparatus 104 at fixed intervals. Note that the processing for displaying the execution situation in the data processing device 101 (processing from step S710 to step S713) and the processing of the automatic control in the image processing apparatus 104 (processing from step S704 to step 705) are performed asynchronously.

In step S710, the data processing device 101 transmits an execution situation acquisition request for inquiring an execution situation to the image processing apparatus 104. In step S711, the image processing apparatus 104 acquires the execution situation and transmits the acquired execution situation to the data processing device 101. In step S712, the data processing device 101 displays the execution situation received from the image processing apparatus 104 on the display 214. In step S713, the data processing device 101 terminates the processing in a case where the execution situation received from the image processing apparatus 104 indicates the termination of execution. On the other hand, in a case where the execution situation does not indicate the termination of execution, the processing returns to step S710.

Figure 10:
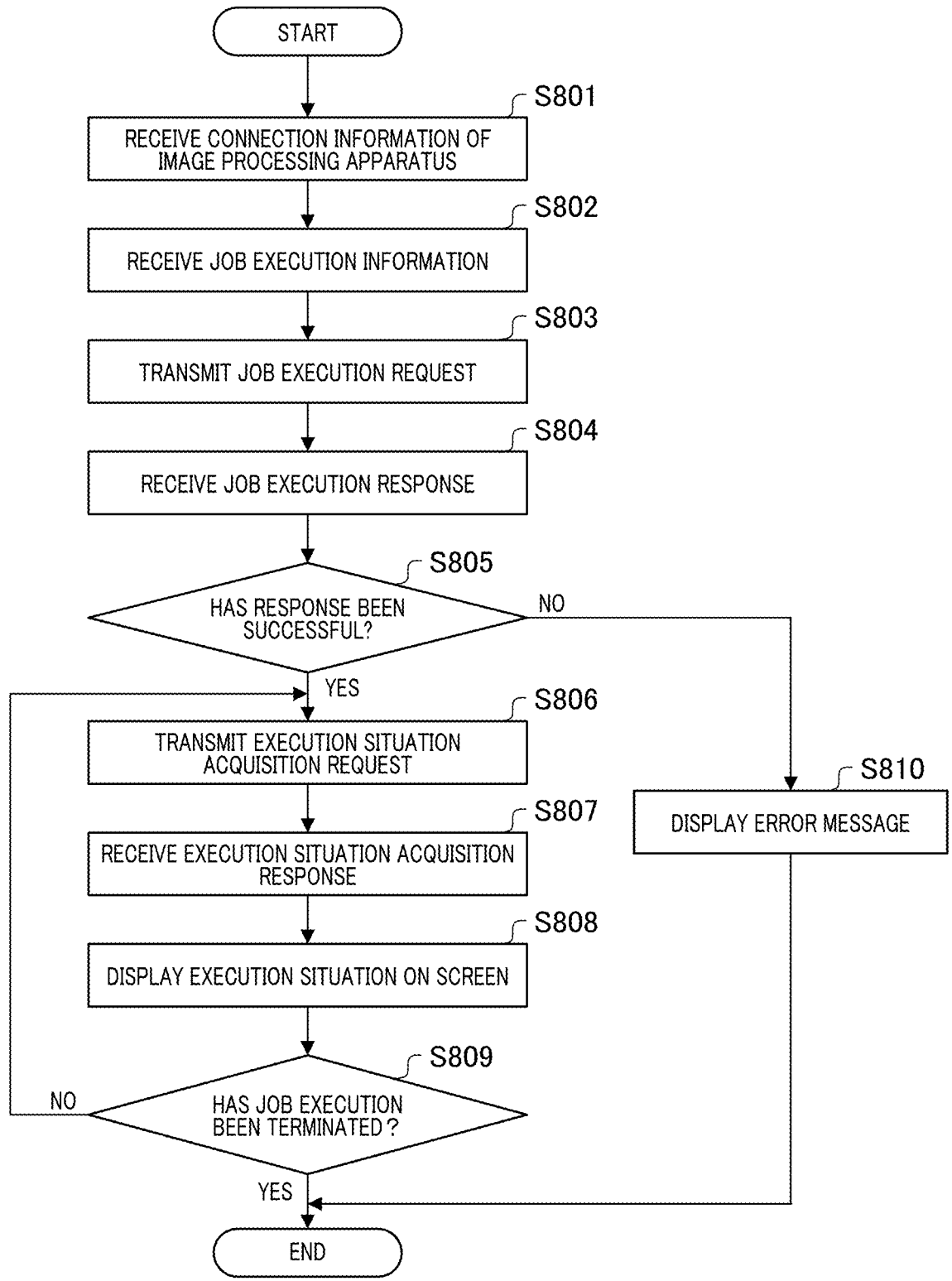
FIG. 10 is a flowchart illustrating processing of the data processing device in the first embodiment.

FIG. 10 is a flowchart illustrating processing of the data processing device 101 in the first embodiment. Specifically, FIG. 10 is a flowchart illustrating job execution instruction processing executed by the data processing device 101. The processing in the flowchart of FIG. 10 is realized by the CPU 202 of the data processing device 101 reading a program for realizing each control module stored in the ROM 203 or the storage device 209 to the RAM 204 and executing the program. The flowchart of FIG. 10 is equivalent to processing performed in the data processing device 101 in the sequence diagram of FIG. 7.

In step S801, the UI control unit 402 receives information (an IP address and the like) for connection to the image processing apparatus 104 that performs job execution by the user operating the application 401 on the screen. Note that the information for connection to the image processing apparatus 104 is not input from the user, and may be obtained by searching for the image processing apparatus 104 connected to the network 103 using the wireless LAN communication unit 212. In the subsequent steps, it is assumed that communication with the image processing apparatus 104 is performed using the information received in step S801.

In step S802, the UI control unit 402 receives job execution information by the user operating the application 401 on the screen. The job execution information includes information required to execute a job in the image processing apparatus 104 such as an application to be executed in the image processing apparatus 104, a setting value of the job, and login information. In step S803, the MFP control unit 403 transmits a job execution request including the job execution information received in step S802 to the image processing apparatus 104.

In step S804, the MFP control unit 403 receives a job execution response from the image processing apparatus 104 as a response to step S803. In step S805, the MFP control unit 403 determines the content of the job execution response. In a case where the content of the job execution response indicates a success, the MFP control unit 403 causes the processing to proceed to step S806, and otherwise the MFP control unit 403 causes the processing to proceed to step S810.

In step S806, the MFP control unit 403 transmits an execution situation acquisition request for acquiring a job execution situation to the image processing apparatus 104. In step S807, the MFP control unit 403 receives an execution situation acquisition response from the image processing apparatus 104 as a response to step S806.

In step S808, the UI control unit 402 displays information (a message, an image, or the like) for the user to ascertain a job execution situation on the display 214 based on the execution situation response received in step S807.

In step S809, the MFP control unit 403 terminates the flowchart in a case where the execution situation response received in step S807 indicates the termination of job execution, and otherwise the MFP control unit 403 causes the processing to proceed to step S806.

In step S810, the UI control unit 402 displays a content that an instruction for executing a job has become an error on the display 214 and terminates the flowchart.

Figure 11A:
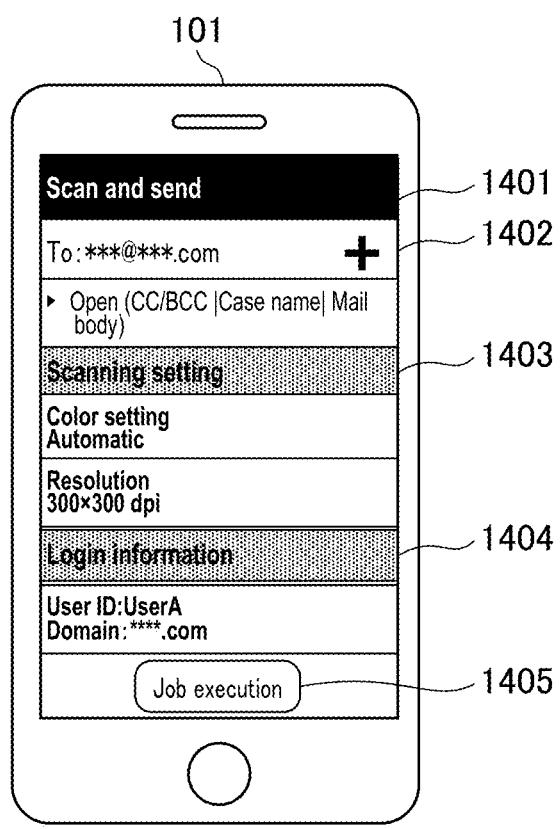
FIGS. 11A and 11B are diagrams illustrating an example of a screen of the data processing device in the first embodiment.
Figure 11B:
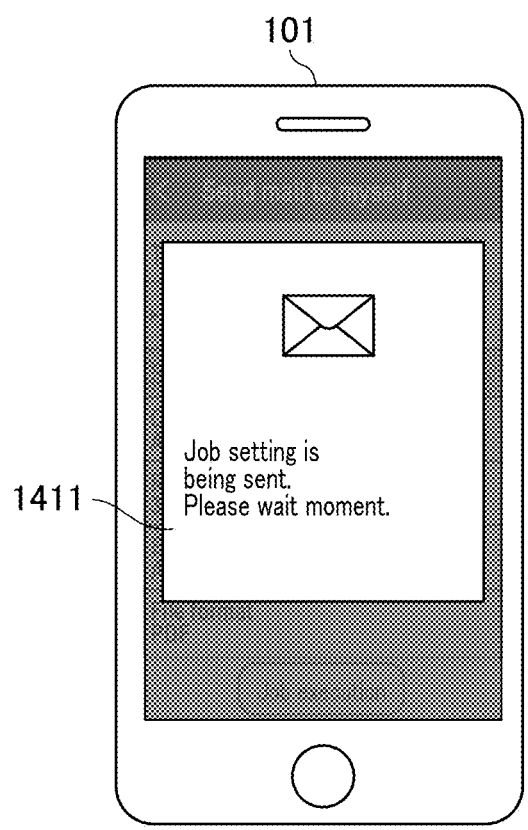

FIGS. 11A and 11B are diagrams illustrating an example of the screen of the data processing device 101 in the first embodiment. Specifically, FIGS. 11A and 11B illustrate an example of the screen of the data processing device 101 on which the application 401 is displayed. FIG. 11A is a diagram illustrating a screen for the user to input job execution information. An area 1401 is an area showing an application to be executed, and a transmission application is displayed as an example. An area 1402 is an area for inputting a transmission destination. An area 1403 is an area for setting a setting value of scanning. An area 1404 is an area for inputting login information of the image processing apparatus 104. When the user's pressing of a "job execution" button which is a button 1405 is detected, the processing of step S802 is performed.

FIG. 11B is a diagram illustrating an example of a screen showing a job execution situation displayed in step S808. In a display screen 1411, the present job execution situation is displayed using a message and an image.

Figure 12:
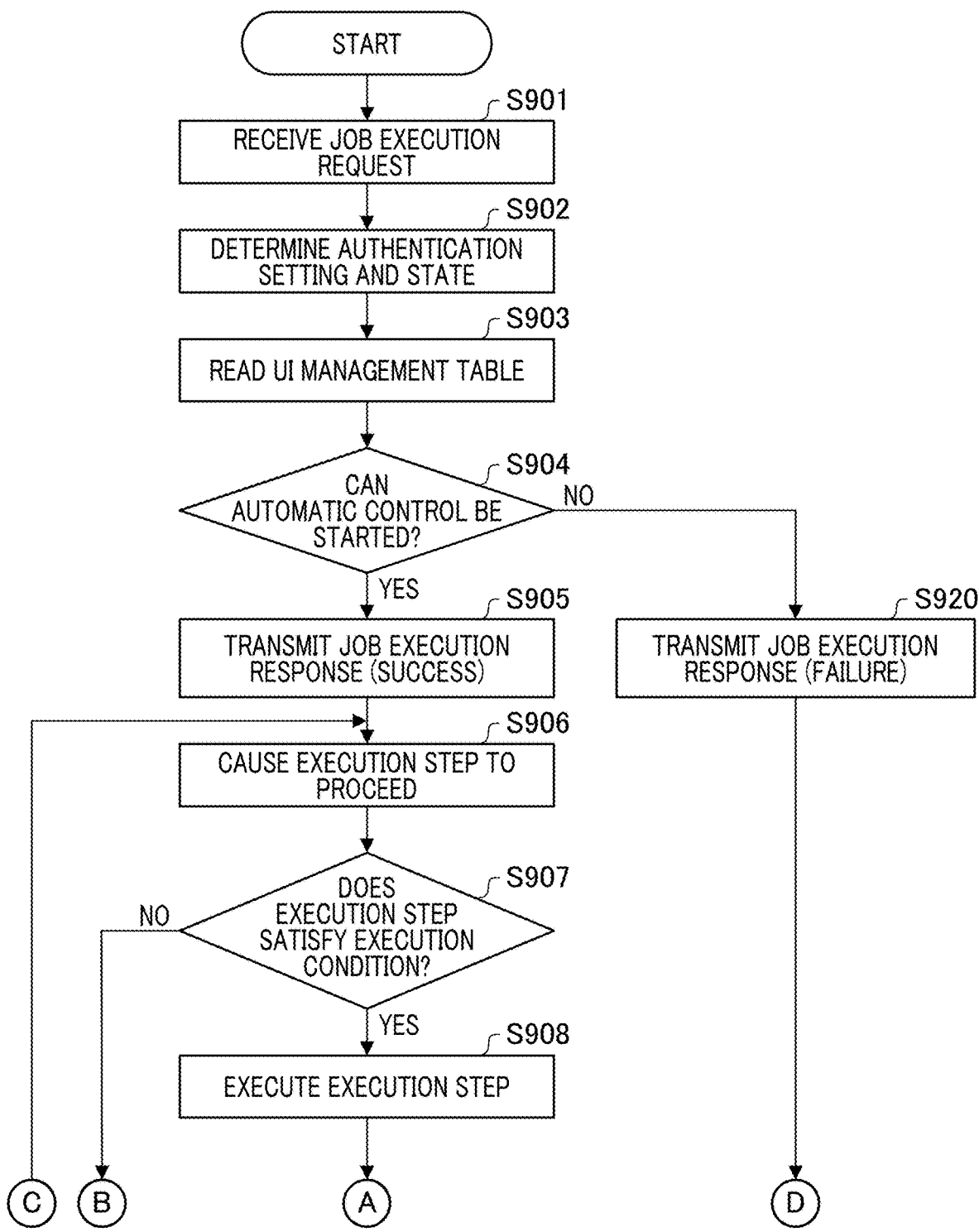
FIG. 12 is a flowchart illustrating processing of the image processing apparatus in the first embodiment.
Figure 13:
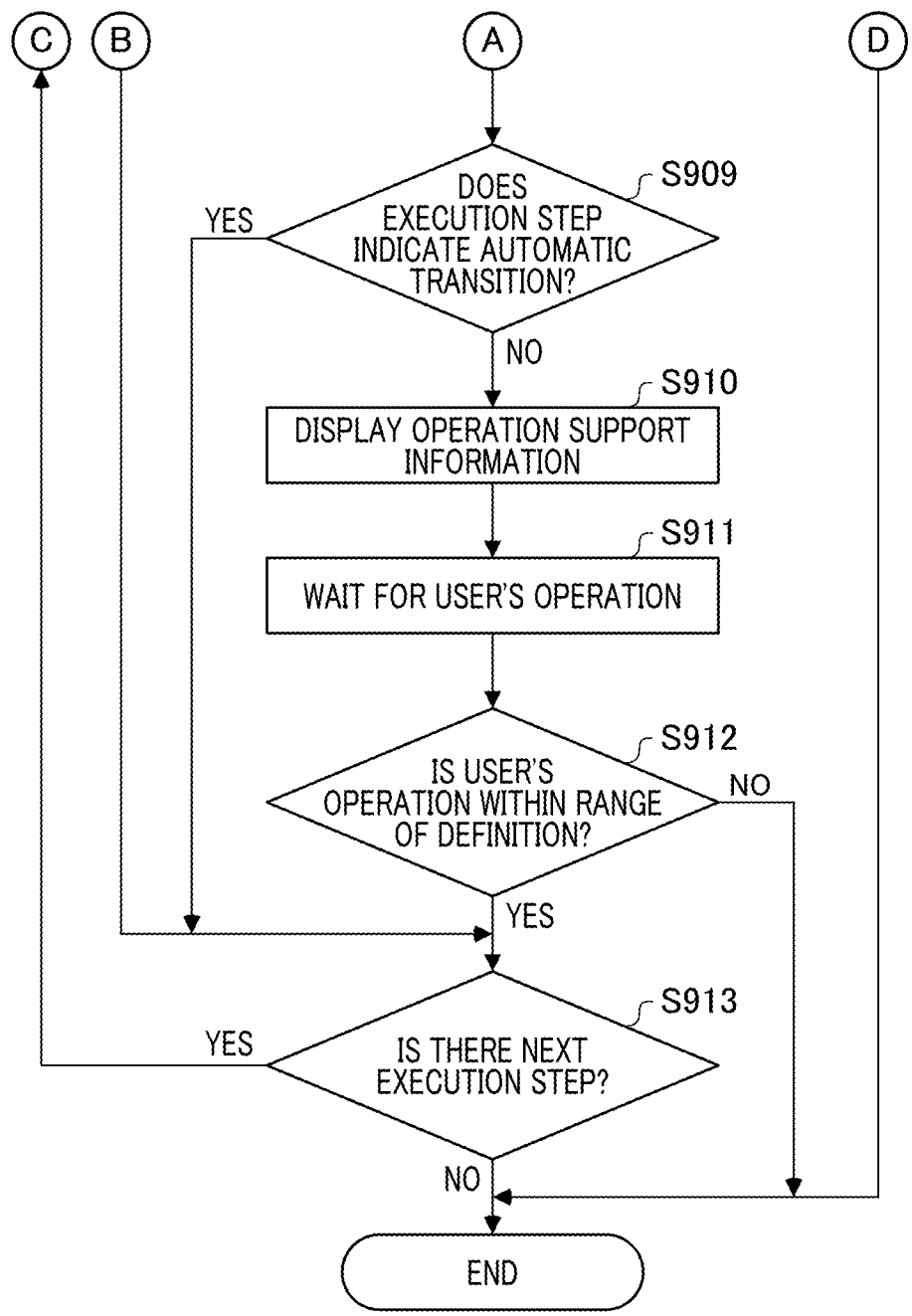
FIG. 13 is a flowchart illustrating processing of the image processing apparatus in the first embodiment.

FIGS. 12 and 13 are flowcharts illustrating processing of the image processing apparatus 104 in the first embodiment. Automatic control processing in the image processing apparatus 104 will be described using FIGS. 12 and 13. The flowcharts of FIGS. 12 and 13 are realized by the CPU 302 of the image processing apparatus 104 reading a program for realizing each control module stored in the ROM 304 or the HDD 305 to the RAM 303 and executing the program. The flowcharts of FIGS. 12 and 13 are equivalent to processing performed by the image processing apparatus 104 in steps S701 to S705 in the sequence diagram of FIG. 9. Automatic control processing will be described based on the flowcharts of FIGS. 12 and 13, and will be described other drawings if necessary.

In step S901, the automatic control processing unit 504 receives a job execution request transmitted from the data processing device 101 through the network 103. The job execution request is, for example, the information transmitted in step S803. In step S902 the authentication control unit 503 identifies authentication setting and an authentication state of the image processing apparatus 104.

In step S903, the UI control unit 502 acquires information corresponding to the authentication setting and the authentication state identified in step S902 from the automatic control management table 505 as automatic control information. For example, in the case of "authenticated/display login screen when operation in device is started" and an authentication state of "unauthenticated", a row 617 to a row 624 in the automatic control management table 505 (see FIGS. 6 to 8) are read. Hereinafter, each step will be described using a case where the row 617 to the row 624 are read as automatic control information as an example.

In step S904, the automatic control processing unit 504 determines whether or not automatic control can be started. Specifically, check processing defined in a first execution step (a row in which the execution step column 603 is "0") of the automatic control read in step S903 is executed. The automatic control processing unit 504 causes the processing to proceed to step S905 in a case where the condition of the automatic control has been satisfied, and otherwise causes the processing to proceed to step S920.

Here, a specific example of the check processing in step S904 will be described using the row 617 in FIG. 7 as an example. In the row 617, the processing column 604 is defined as "screen check", and the parameter column 605 is defined as "login screen, job situation screen". For this reason, in step S904, it is checked whether a screen displayed on the operation unit 307 is a login screen or a job situation screen. The automatic control processing unit 504 determines that the condition has been satisfied when the screen displayed on the operation unit 307 is a login screen or a job situation screen.

In step S905, the automatic control processing unit 504 transmits a job execution response to the data processing device 101 as a response to the job execution request received in step S901. The job execution response includes information indicating that the job execution request has been successful.

In step S906, the automatic control processing unit 504 causes the execution step to proceed to the next. In step S907, the automatic control processing unit 504 determines whether or not the execution step to be processed satisfies the condition described in the execution condition column 606. The automatic control processing unit 504 causes the processing to proceed to step S908 in a case where the execution step satisfies the execution condition, and otherwise causes the processing to proceed to step S913. Here, a specific example of the processing of step S907 is described using a row 618 in FIG. 7 as an example. In the row 618, the execution condition column 606 is defined as "screen during display !=login screen". The display of "!" indicates a difference from information following the display. For this reason, the automatic control processing unit 504 determines that the execution step satisfies the execution condition when the screen displayed on the operation unit 307 of the image processing apparatus 104 is a screen other than the login screen.

In step S908, the automatic control processing unit 504 performs the processing defined in the processing column 604 of the execution step which is a processing target using the information of the parameter column 605. Two specific examples of the processing of step S908 will be described using a row 621 and a row 624 in FIG. 7.

In a case where the execution step which is a processing target is the row 621, "screen display" is defined in the processing column 604, and "notice screen" is defined in the parameter column 605. In this case, the automatic control processing unit 504 requests the UI control unit 502 to display a notice screen on the operation unit 307 of the image processing apparatus 104. Note that the "notice screen" is a screen for displaying a content of which a user is to be notified by an administrator before the image processing apparatus 104 is used.

In a case where the execution step which is a processing target is the row 624, "job execution" is defined in the processing column 604, and "job execution request:job setting" is defined in the parameter column 605. In this case, the automatic control processing unit 504 requests the job control unit 506 to execute a job using job setting included in the job execution request received in step S901.

Description will return to the flowchart (see FIG. 13). In step S909, the automatic control processing unit 504 determines whether or not the execution step which is a processing target is an automatic transition using the value of the automatic transition column 607. In a case where the automatic transition column 607 is "YES", the processing proceeds to step S913, and in a case where the automatic transition column 607 is "NO", the processing proceeds to step S910.

In step S910, the UI control unit 502 displays operation support information on the operation unit 307 of the image processing apparatus 104. Here, it is assumed that the operation support information is information for transmitting an operation performed by the user to continue or stop the automatic control when the user's operation is waited for without performing an automatic transition. For example, the explanation of an operation may be displayed in a pop-up dialog on the screen displayed on the operation unit 307, or operation information may be displayed in a blank portion of the screen so as not to interfere with the user's operation. In addition, options (buttons or the like) for continuing or stopping automatic control may be explicitly displayed. The user's operation for continuing the automatic transition is defined in the user operation column 608 of the automatic control management table 505. Based on the defined user's operation, the UI control unit 502 determines a content to be displayed as operation support information.

In step S911, the UI control unit 502 waits for the user's operation for the operation unit 307 of the image processing apparatus 104. The UI control unit 502 proceeds to step S912 when detecting the user's operation.

In step S912, the automatic control processing unit 504 determines whether or not the user's operation detected in step S912 is an operation defined in the user operation column 608 of the execution step. The automatic control processing unit 504 causes the processing to proceed to step S913 when the user's operation is an operation defined in the user operation column 608 of the execution step, and otherwise terminates the flowchart to stop the automatic control.

In step S913, the automatic control processing unit 504 determines whether or not there is the next execution step. The automatic control processing unit 504 causes the processing to proceed to step S906 when there is the next execution step, and otherwise terminates the flowchart.

In step S920, the automatic control processing unit 504 transmits a job execution response including information indicating that the job execution request has not been successful to the data processing device 101 as a response to the job execution request received in step S901 to terminate the flowchart.

Note that a configuration may be adopted in which the automatic control can be stopped in steps other than step S912. For example, in a case where the user's operation for the operation unit 307 of the image processing apparatus 104 has been received during processing other than step S911, the flowchart may be terminated. Here, regarding the user's operation, the user's operation becoming a trigger may be or may not be limited. Alternatively, in a case where a screen transition or logout has occurred by the user's operation, the flowchart may be terminated. Further, a trigger for stopping the automatic control may be anything other than the user's operation. For example, when it is detected that network communication with the data processing device 101 cannot be performed, the flowchart may be terminated.

FIGS. 14A, 14B, 14C, 15A, and 15B are diagrams illustrating an example of the screen of the image processing apparatus 104 in the first embodiment. An example of a screen to be displayed on the operation unit 307 of the image processing apparatus 104 will be described using FIGS. 14A, 14B, 14C, 15A, and 15B.

Figure 14A:
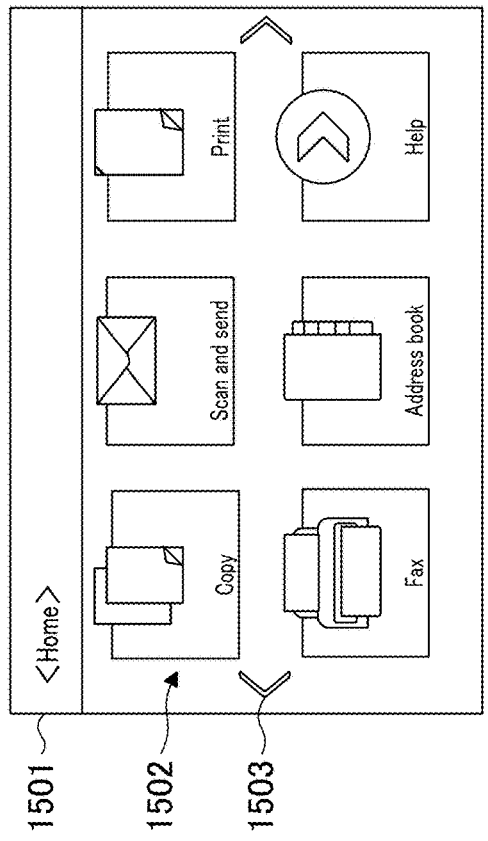
FIGS. 14A, 14B, and 14C are diagrams illustrating an example of a screen of the image processing apparatus in the first embodiment.

FIG. 14A illustrates a home screen and is a diagram illustrating an example of a screen displayed when a user logs in the image processing apparatus 104. In the home screen, applications that can be executed in the image processing apparatus 104 are aligned as buttons, and the home screen has a function of calling a selected application when it is detected that the user has selected a button. In a case where the button does not fit on the screen, the button is displayed on a plurality of pages.

An area 1501 is an area indicating an application that is being displayed. A button 1502 is a button for calling an application. In the present embodiment, there are buttons corresponding to functions of copy, scan and send, print, fax, address book, and help. An icon 1503 is an icon for performing page feeding. A screen displayed when the user logs on the image processing apparatus 104 is not limited to the home screen, and may be a screen of each application.

Figure 14B:
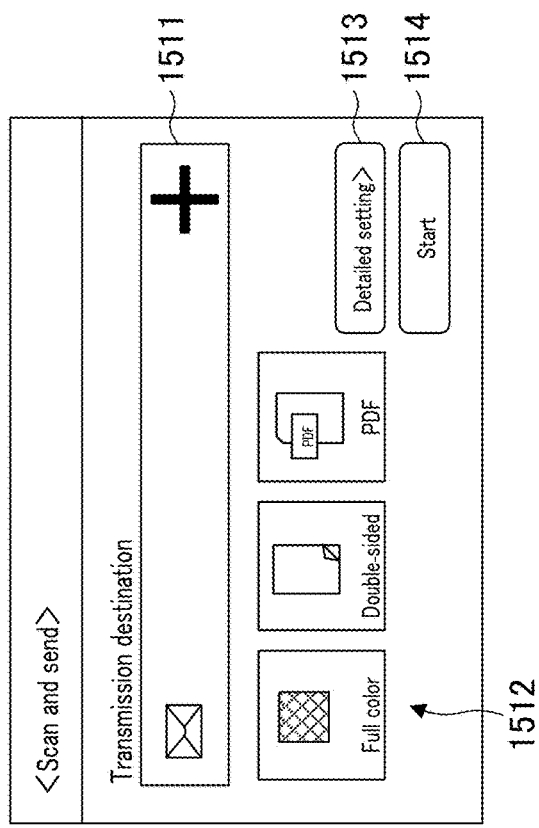

FIG. 14B is a diagram illustrating an example of a screen of an application for executing a job. As an example, a "scan and send" application for transmitting an e-mail is illustrated. An area 1511 is an area for setting an address to which an e-mail is to be transmitted. A button 1512 is a button for performing the setting of a setting value of scanning. In the present embodiment, there are buttons corresponding to full color, double-sided, and PDF. A button 1513 is a button for calling a setting item that does not fit on the screen. A button 1514 is a button for receiving a job started by the user. FIG. 14B illustrates a function screen displayed when a "scan and send" button is selected in the screen illustrated in FIG. 14A, the function screen is a screen for performing the setting and execution of a function.

Figure 14C:
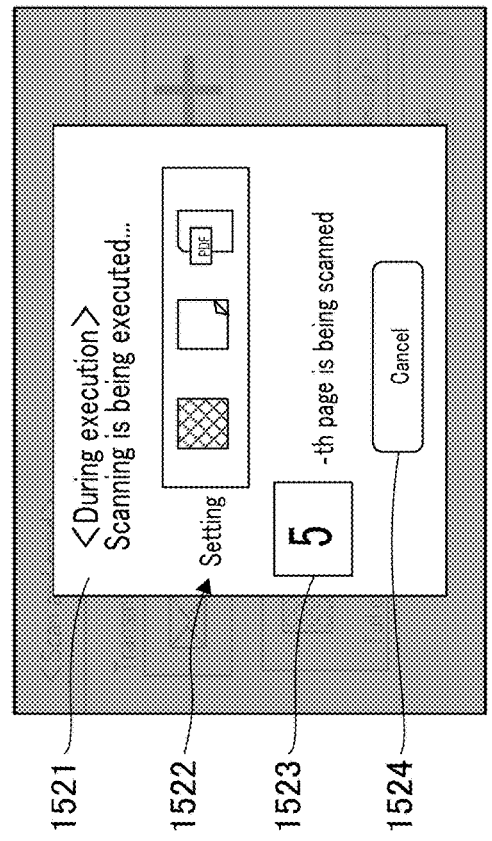

FIG. 14C is a diagram illustrating an example of a screen during the execution of a job, and the screen is displayed when the button 1514 is pressed in FIG. 14B. A situation of job execution is illustrated by performing pop-up display 1521 on the screen illustrated in FIG. 14B. An area 1522 is an area for displaying a setting value of a job being executed.

An area 1523 is an area indicating a progress situation of a job. A button 1524 is a button for receiving a job cancelled by a user.

Figure 15B:
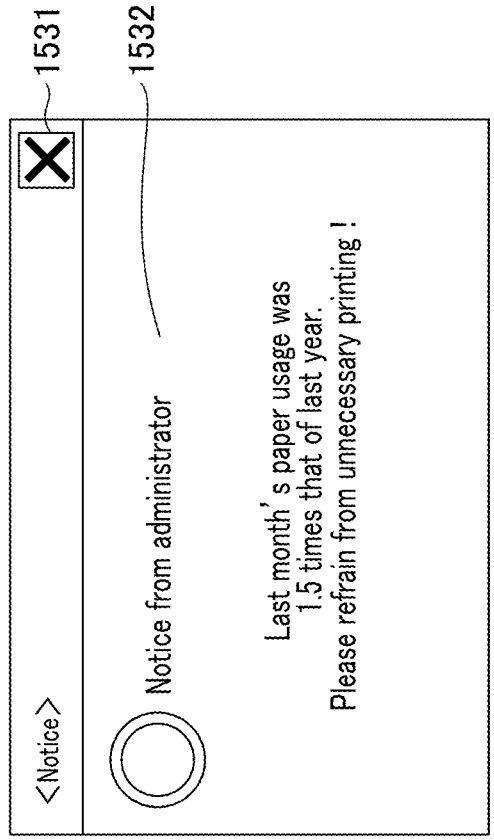
FIGS. 15A and 15B are diagrams illustrating examples of the screen of the image processing apparatus in the first embodiment.
Figure 15A:
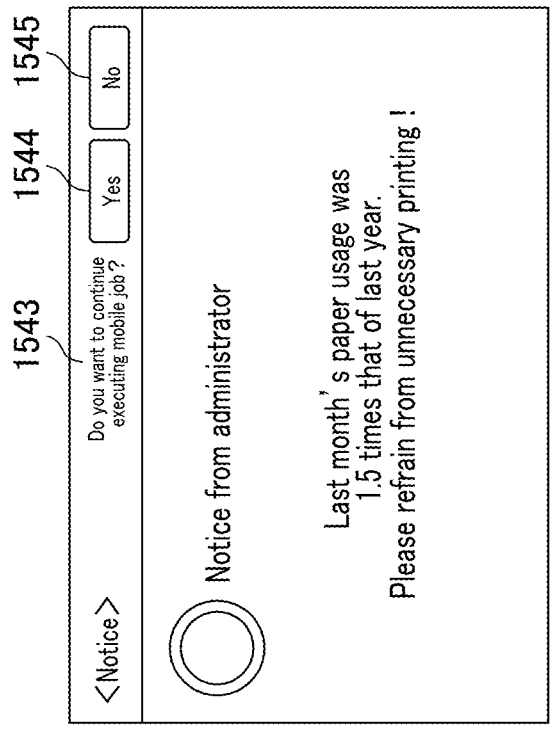

FIG. 15A is a diagram illustrating an example of a notice screen. A timing at which the notice screen is displayed is determined by setting. For example, the timing is a timing immediately after the user logs on the image processing apparatus 104 or a timing immediately after the user logs out of the image processing apparatus 104. A button 1531 is a button for closing the notice screen. An area 1532 is an area for displaying an image or a message which is set by an administrator.

FIG. 15B is a diagram illustrating an example of a screen on which operation support information is displayed. As an example, a case where operation support information is displayed on the notice screen is illustrated. A message 1543 is a message (automatic execution confirmation information) for inquiring the user whether or not to continue automatic control. A button 1544 is a button for receiving automatic control continued by the user. A button 1545 is a button for receiving automatic control stopped by the user.

Which display is performed on the operation unit 307 of the image processing apparatus 104 in a case where processing is performed in the procedure shown in the flowcharts of FIGS. 12 and 13 will be described. The image processing apparatus 104 receives a job execution request from the data processing device 101. Then, a login screen (not illustrated) for receiving the user's login transitions to the home screen in FIG. 14A and then transitions to the application screen in FIG. 14B, and the screen during job execution in FIG. 14C is displayed. The image processing apparatus 104 automatically performs these screen transitions when receiving a job. In this manner, the user having transmitted the job from the data processing device 101 can confirm that processing is being performed by viewing the operation unit 307 of the image processing apparatus 104. That is, even when a job execution request is transmitted from the data processing device 101, the same screen transition as in a case where the user operates the operation unit 307 to execute a job is performed in the operation unit 307 of the image processing apparatus 104. In addition, when the job execution request is transmitted from the data processing device 101, a job is executed in the image processing apparatus 104 without operating the operation unit of the image processing apparatus 104 by the user. In the present embodiment, the home screen is an example of a predetermined screen (post-login screen) which is displayed after performing login based on user information which is information required for login, and the application screen is an example of a function screen corresponding to a job.

Note that, in a case where setting for displaying the notice screen shown in FIGS. 15A and 15B after login is performed, the notice screen shown in FIGS. 15A and 15B is displayed before a transition to the home screen, and an automatic transition to the next screen is not performed.

Figure 16:
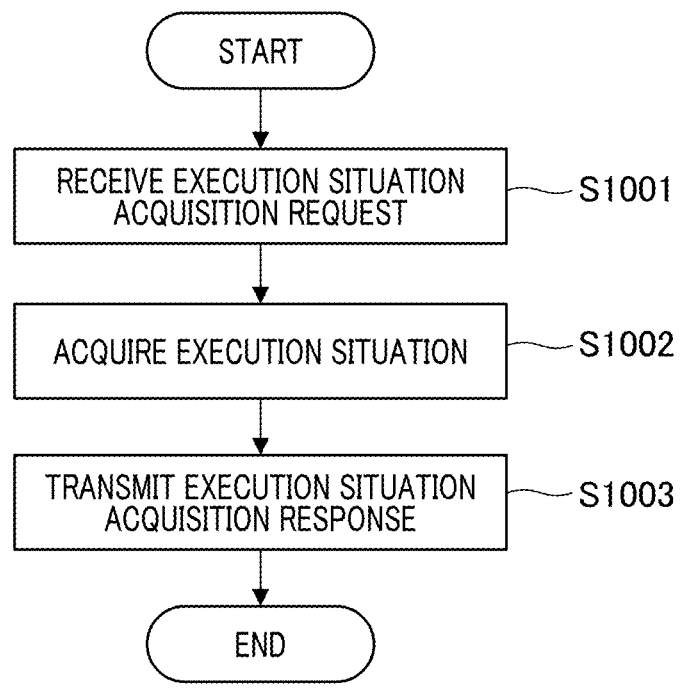
FIG. 16 is a flowchart illustrating processing of the image processing apparatus in the first embodiment.

FIG. 16 is a flowchart illustrating processing of the image processing apparatus 104 in the first embodiment. Processing for an execution situation acquisition request executed by the image processing apparatus 104 of the present embodiment is described using FIG. 16. The flowchart of FIG. 16 is realized by the CPU 302 of the image processing apparatus 104 reading program for realizing each control module stored in the ROM 304 or the HDD 305 to the RAM 303 and executing the program. The flowchart of FIG. 16 is equivalent to the processing performed in the image processing apparatus 104 from steps S710 to S711 in the sequence diagram of FIG. 9. In addition, the flowchart of FIG. 16 is executed asynchronously with the flowcharts of FIGS. 12 and 13.

In step S1001, the automatic control processing unit 504 receives the execution situation acquisition request transmitted from the data processing device 101 through the network 103. Here, the execution situation acquisition request is, for example, information transmitted in step S806.

In step S1002, the automatic control processing unit 504 acquires an execution situation of automatic control. The execution situation is, for example, information indicating an execution situation such as how much the execution step of the automatic control has proceeded, what processing is currently being performed, whether waiting for the user's operation is being performed, or whether the automatic control has been terminated.

In step S1003, the automatic control processing unit 504 transmits the execution situation of the automatic control which is acquired in step S1002 to the data processing device 101 as a response to the execution situation acquisition request received in step S1001. In this manner, the automatic control processing unit 504 transmits the execution situation of the automatic control which is acquired in step S1002 to the data processing device 101 as an execution situation acquisition response.

The processing in a case where the data processing device 101 gives a job execution instruction to the image processing apparatus 104 has been described above by the procedure described in the present embodiment. In the present embodiment, a series of processes until a job is executed in the image processing apparatus 104 are automatically performed on the operation unit 307 of the image processing apparatus 104. In addition, the UI control unit 502 performs a screen transition in a case where the network I/F 308 receives a job in the same manner as a screen transition in a case where the operation unit 307 gives an instruction of a job. Thereby, the same display as in a case where the user manually executes a job using the operation unit 307 can be presented to the user, thereby improving usability.

Second Embodiment

In the first embodiment, in a case where waiting for a user's operation has occurred for during automatic control processing, operation support information is displayed on the operation unit 307 of the image processing apparatus 104. In addition, whether or not to continue the processing in a case where the user's operation is waited for is determined by performing an operation on the operation unit 307. In a second embodiment, in a case where a user's operation is waited for during automatic control processing, operation support information is displayed on a display 214 of a data processing device 101. In addition, description is given of an embodiment in which whether or not to continue the processing is determined by operating a touch panel 215 of the data processing device 101. The second embodiment is a modification of the first embodiment, and thus only different configurations from the first embodiment will be described.

Figure 17:
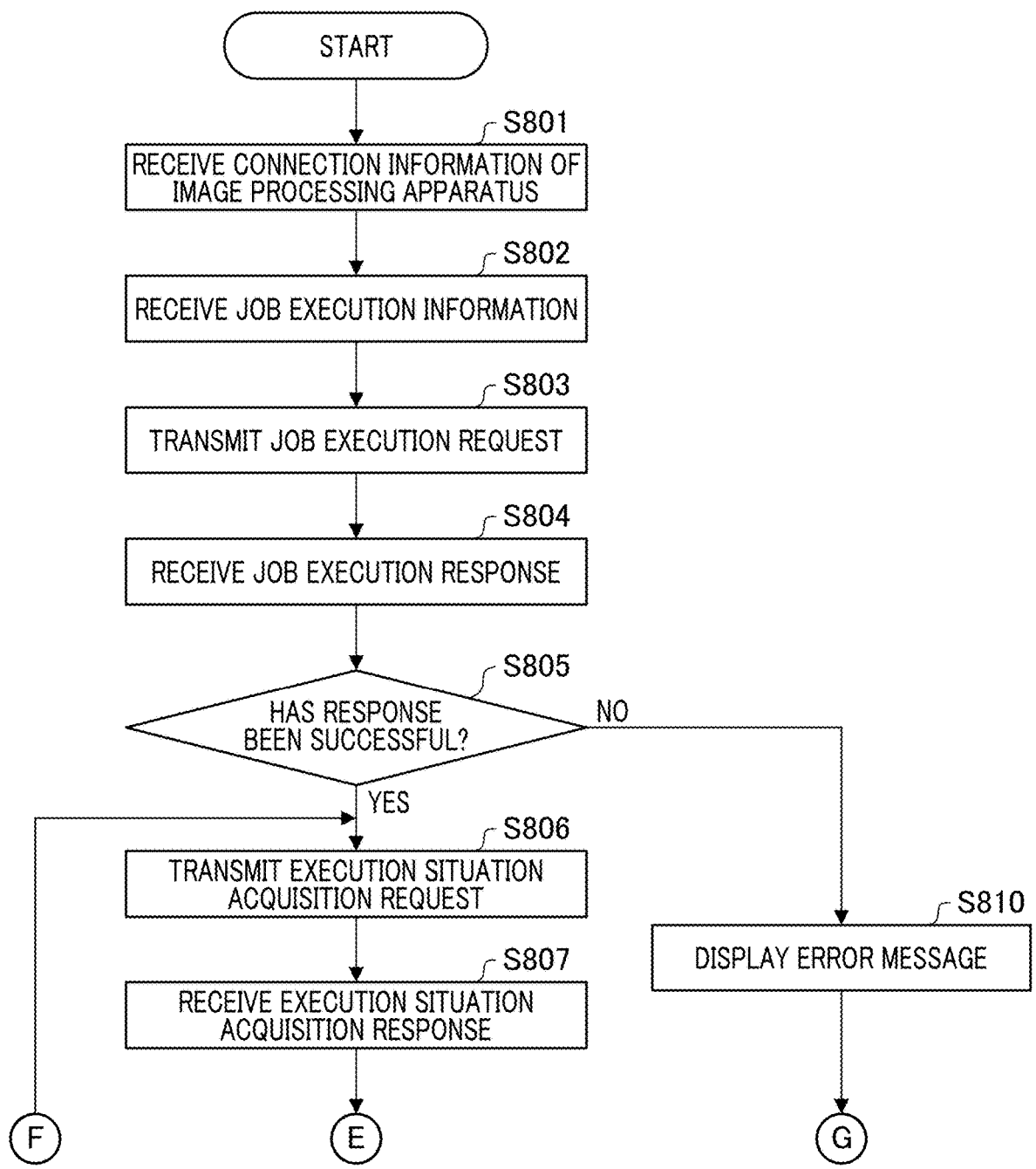
FIG. 17 is a flowchart illustrating processing of a data processing device in a second embodiment.
Figure 18:
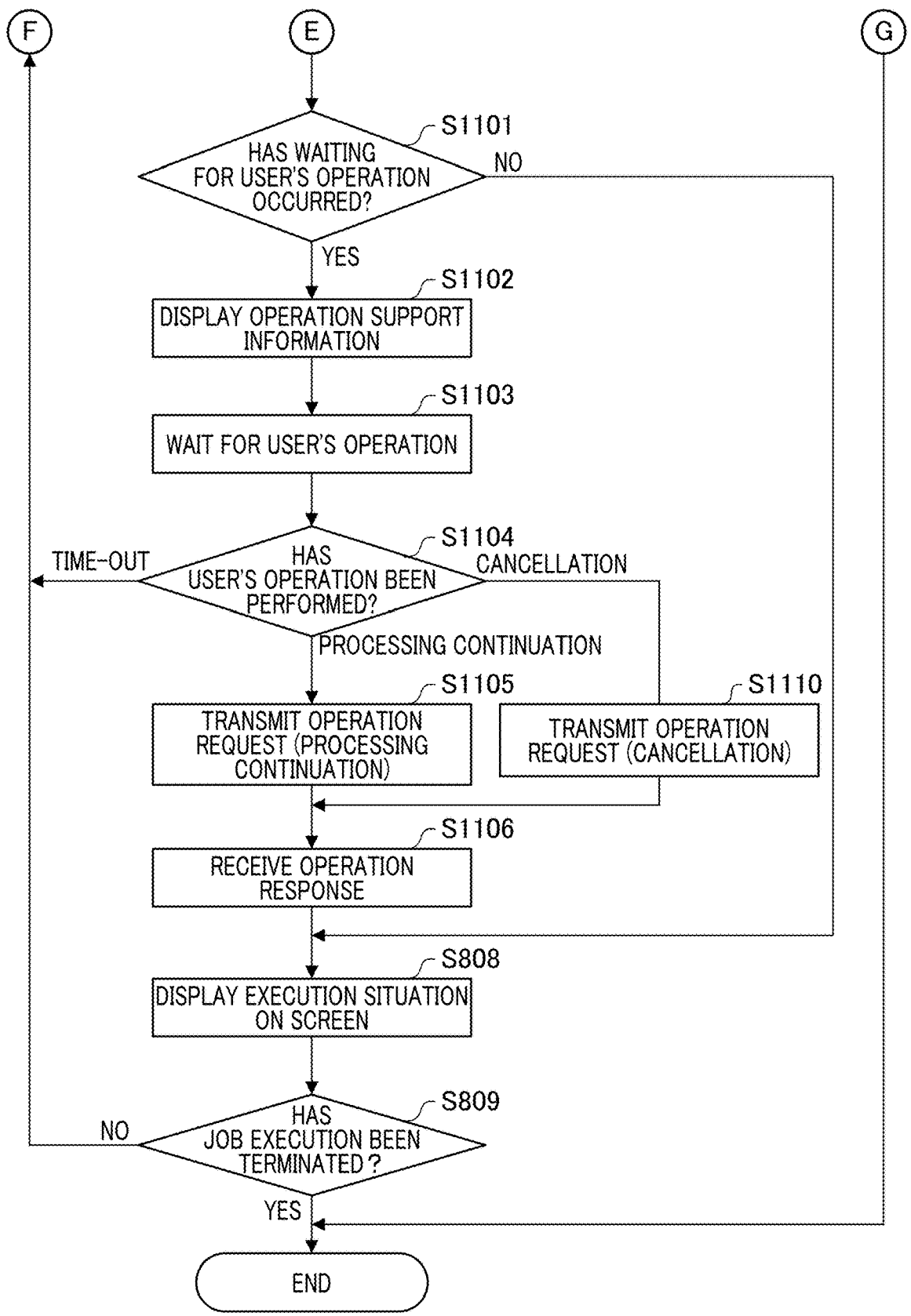
FIG. 18 is a flowchart illustrating processing of the data processing device in the second embodiment.

FIGS. 17 and 18 are flowcharts illustrating processing of the data processing device 101 in the second embodiment. Job execution instruction processing executed by the data processing device 101 in the second embodiment will be described using FIGS. 17 and 18. FIGS. 17 and 18 are flowcharts obtained by modifying FIG. 8. For this reason, only different configurations from FIG. 8 will be described.

In step S1101, an MFP control unit 403 determines whether or not waiting for a user's operation has occurred in an image processing apparatus 104 from the execution situation response received in step S807. The MFP control unit 403 causes the processing to proceed to step S1102 in a case where waiting for the user's operation has occurred, and otherwise causes the processing to proceed to step S808.

In step S1102, a UI control unit 402 displays operation support information on the display 214 of the data processing device 101. Specifically, the operation support information displayed on the display 214 includes information indicating that waiting for the user's operation has occurred in the image processing apparatus 104, a button for selecting whether to continue or stop the automatic control in the image processing apparatus 104, and the like.

In step S1103, the UI control unit 402 waits for the user's operation for the touch panel 215 of the data processing device 101. In step S1104, the UI control unit 402 causes the processing to proceed to step S806 in a case where the user's operation has not been performed for a fixed period of time. In addition, the UI control unit 402 causes the processing to proceed to step S1105 in a case where the user's operation indicates the continuation of the automatic control, and causes the processing to proceed to step S1110 in a case where the user's operation indicates the cancellation of the automatic control.

In step S1105, the MFP control unit 403 transmits an operation request including information indicating that the automatic control in the image processing apparatus 104 is continued to the image processing apparatus 104. On the other hand, in step S1110, the MFP control unit 403 transmits an operation request (hereinafter, a cancellation request) including information indicating that the automatic control in the image processing apparatus 104 is cancelled to the image processing apparatus 104.

In step S1106, the MFP control unit 403 receives an operation response from the image processing apparatus 104 as a response to step S1105 or step S1110. The operation response includes the success or failure of the operation request in the image processing apparatus 104, the current execution situation of the automatic control, and the like.

Note that a configuration may be adopted in which a cancellation request can be transmitted to the image processing apparatus 104 not only in a case where waiting for the user's operation is performed in the image processing apparatus 104 but also at any timing. For example, a cancellation button is displayed together with an execution situation when the execution situation is displayed in step S808. In addition, when the UI control unit 402 detects the pressing of the cancellation button, the MFP control unit 403 may transmit the cancellation request to the image processing apparatus 104.

Figure 19A:
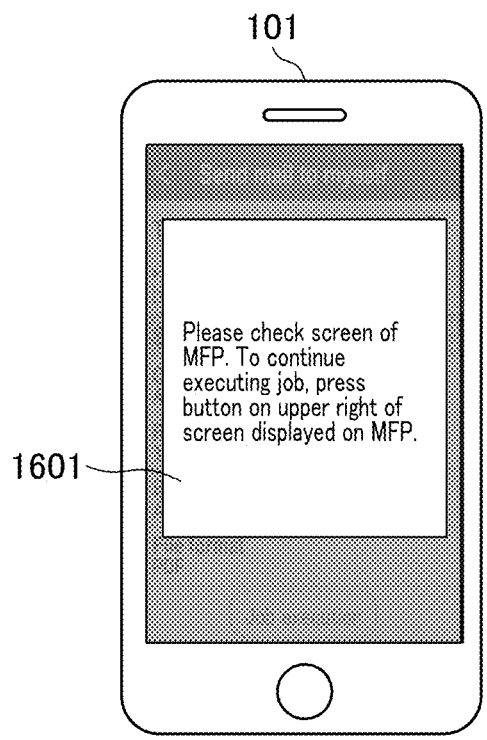
FIGS. 19A, 19B, and 19C are diagrams illustrating an example of a screen of the data processing device in the second embodiment.
Figure 19B:
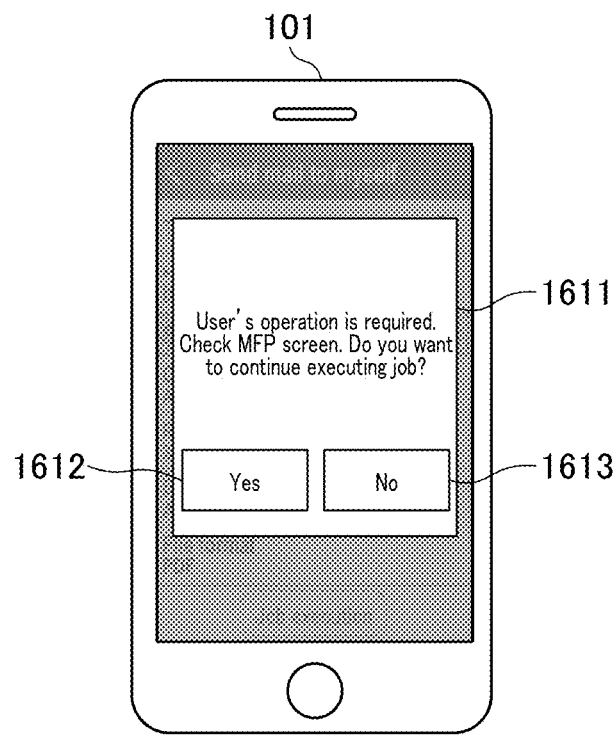
Figure 19C:
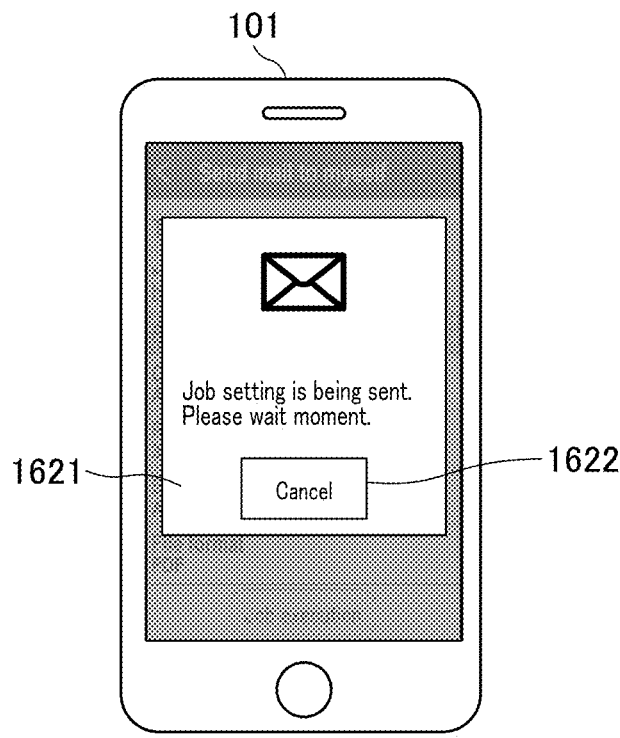

FIGS. 19A, 19B, and 19C are diagrams illustrating an example of a screen of the data processing device 101 in the second embodiment. Specifically, the diagrams illustrate an example of a screen on which an application 401 of the data processing device 101 is displayed.

FIG. 19A is a diagram illustrating an example of operation support information displayed by the application 401. The application 401 displays a message 1601 for performing an operation performed by a user in order to continue automatic control on the screen of the data processing device 101.

FIG. 19B is a diagram illustrating another example of operation support information displayed by the application 401. The application 401 displays a button 1612 and a button 1613 for selecting whether to continue or stop the automatic control on the screen of the data processing device 101, together with a message 1611 indicating that the user's operation is required.

FIG. 19C is a diagram illustrating an example of a screen showing a job execution situation. A display 1621 includes a message and an image, and the application 401 displays the current job execution situation on the screen of the data processing device 101. A button 1622 is a button for transmitting a cancellation request for stopping the automatic control to the image processing apparatus 104 by the user's operation.

Figure 20:
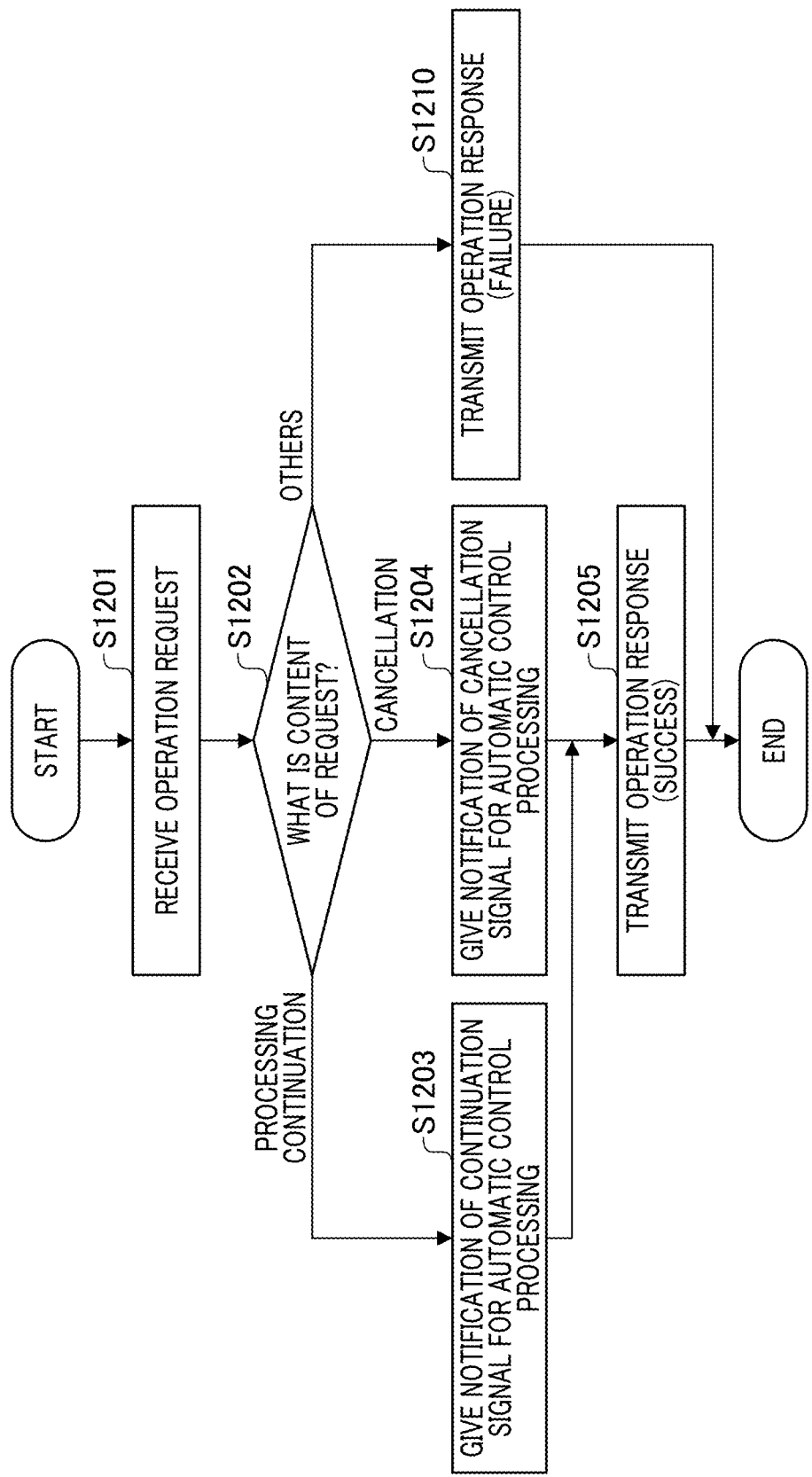
FIG. 20 is a flowchart illustrating processing of an image processing apparatus in the second embodiment.

FIG. 20 is a flowchart illustrating processing of the image processing apparatus 104 in the second embodiment. Processing for an operation request executed by the image processing apparatus 104 is described using FIG. 20. The flowchart of FIG. 20 is realized by a CPU 302 of the image processing apparatus 104 reading program for realizing each control module stored in a ROM 304 or an HDD 305 to a RAM 303 and executing the program.

In step S1201, an automatic control processing unit 504 receives the operation request transmitted from the data processing device 101 through a network 103. This is, for example, information transmitted in step S1105 or step S1110. The flowchart of FIG. 30 and the flowcharts of FIGS. 20 and 21 to be described below are executed asynchronously.

In step S1202, the automatic control processing unit 504 determines the content of the operation request transmitted from the data processing device 101. The automatic control processing unit 504 causes the processing to proceed to step S1203 in a case where the content of the operation request indicates the continuation of the processing, and causes the processing to proceed to step S1204 in a case where the content of the operation request indicates the cancellation of the processing. In addition, the automatic control processing unit 504 causes the processing to proceed to step S1210 in a case where the content of the operation request indicates other contents.

In step S1203, the automatic control processing unit 504 gives a notification of a continuation signal as an operation signal for automatic control processing (flowcharts of FIGS. 21 and 22) being executed asynchronously. The signal is means for giving a notification of information for processing being executed asynchronously.

In step S1204, the automatic control processing unit 504 gives a notification of a cancellation signal as an operation signal for automatic control processing (the flowcharts of FIGS. 21 and 22) being executed asynchronously.

In step S1205, the automatic control processing unit 504 transmits an execution situation acquisition response to the data processing device 101 as a response to the operation request received in step S1201. The execution situation acquisition response includes the current execution situation of the automatic control processing and information indicating that the operation request has been successful.

In step S1210, the automatic control processing unit 504 transmits an execution situation acquisition response to the data processing device 101 as a response to the operation request received in step S1201. The execution situation acquisition response includes the current execution situation of the automatic control processing and information indicating that the operation request has not been successful.

Figure 21:
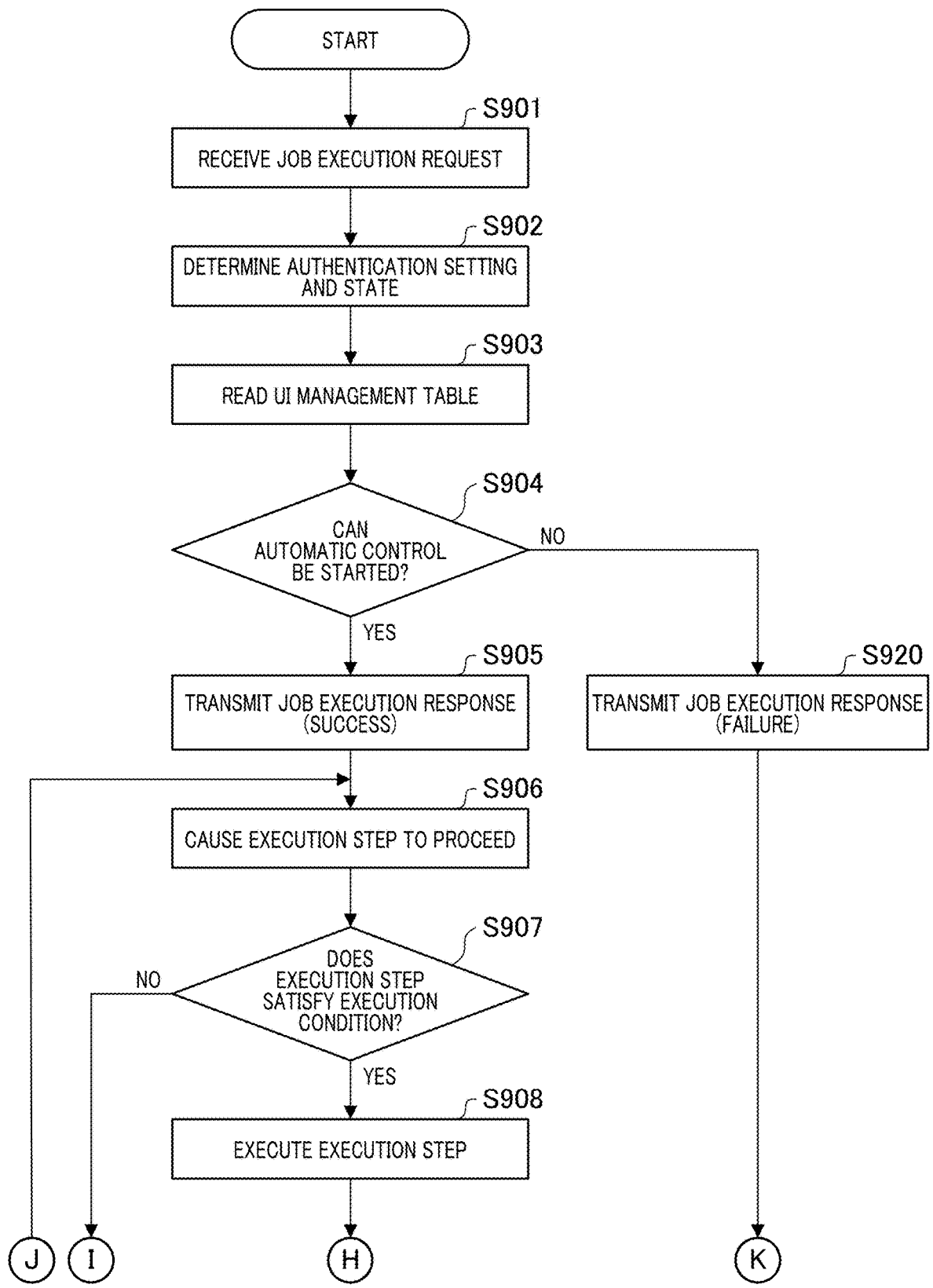
FIG. 21 is a flowchart illustrating processing of the image processing apparatus in the second embodiment.
Figure 22:
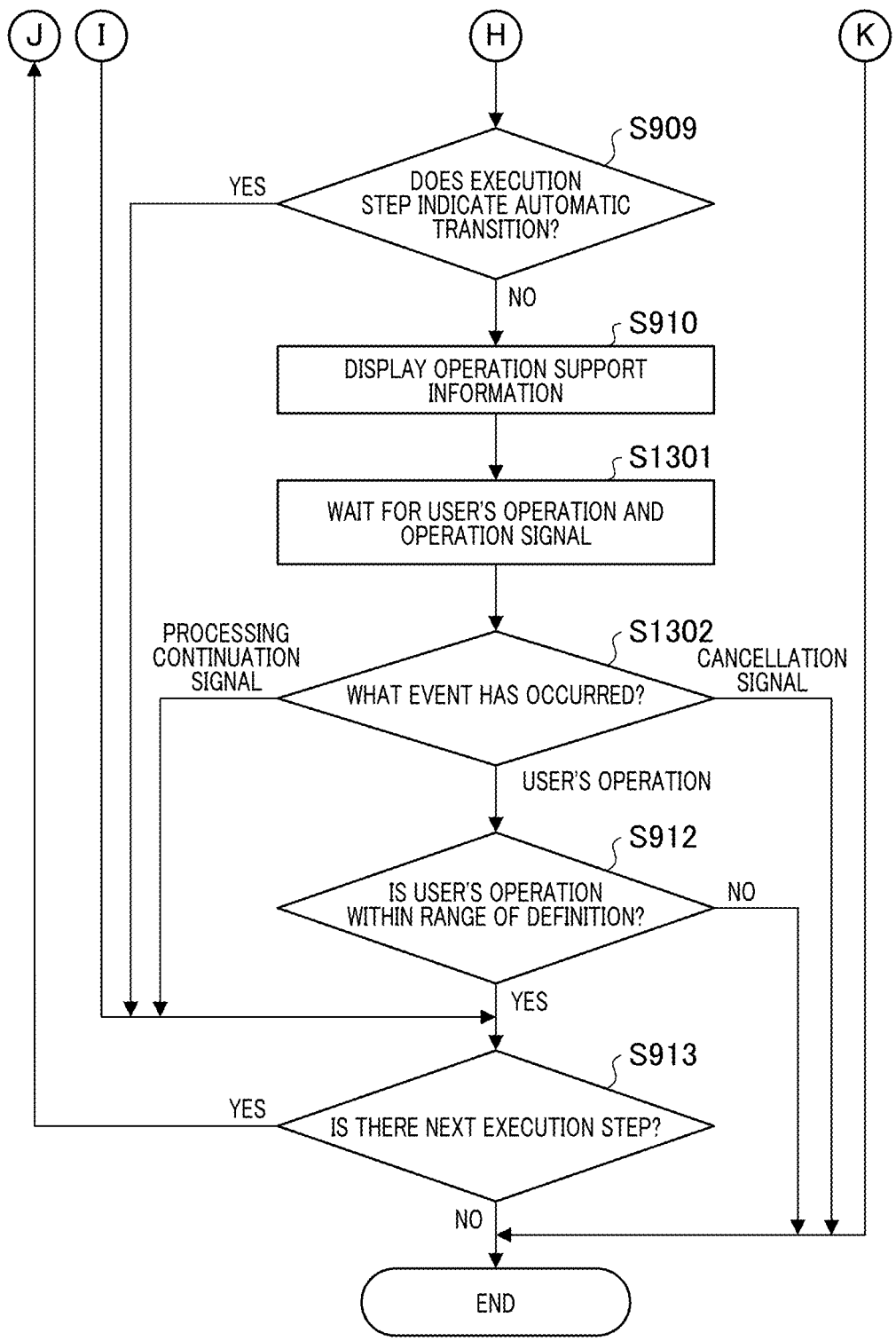
FIG. 22 is a flowchart illustrating processing of the image processing apparatus in the second embodiment.

FIGS. 20 and 21 are flowcharts illustrating processing of the image processing apparatus 104 in the second embodiment. Automatic control processing executed by the image processing apparatus 104 will be described using FIGS. 20 and 21. FIGS. 20 and 21 are flowcharts obtained by modifying FIGS. 12 and 13. Only different configurations from FIGS. 12 and 13 will be described.

In step S1301, the automatic control processing unit 504 waits for a user's operation for the operation unit 307 of the image processing apparatus 104 and an operation signal from processing being executed asynchronously. When any one of the user's operation and the operation signal is detected, the automatic control processing unit 504 proceeds to step S1302.

In step S1302, the automatic control processing unit 504 determines an event detected in step S1301. The automatic control processing unit 504 causes the processing to proceed to step S912 in a case where the event is the user's operation, causes the processing to proceed to step S913 in a case where the event is a processing continuation signal, and terminates the flowchart in a case where the event is a cancellation signal.

As described above, according to the second embodiment, in a case where waiting for a user's operation has occurred in the image processing apparatus 104 during automatic control processing, operation support information can be displayed on the display 214 of the data processing device 101. In addition, whether to continue the processing can be determined by operating the touch panel 215 of the data processing device 101, thereby improving usability.

Although the present invention has been described above in detail based on the preferred embodiments, the present invention is not limited to these specific embodiments, and various modes are also included in the present invention without departing from the scope of the invention. In addition, some of the above-described embodiments may be appropriately combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-159184, filed Sep. 29, 2021, which is hereby incorporated by reference herein in its entirety.

What is claimed is:

1. An image processing apparatus comprising:
a memory; and
at least one processor in communication with the memory, wherein the at least one processor of the image processing apparatus is configured to:
receive job information for giving an instruction to execute a function of the image processing apparatus, from among a plurality of functions including a copy function and a scanning function performable by the image processing apparatus, from an external terminal,
display a home screen including the copy function and the scan function displayed on a display unit of the image processing apparatus based on the received job information, and, in a case where the home screen is displayed, perform display control that automatically transitions from the home screen to a setting screen including multiple setting items related to the function corresponding to the job information without receiving a user's operation for transitioning to the setting screen including the multiple setting items related to the function corresponding to the job information on the home screen displayed on the display unit of the image processing apparatus, and
execute, in a case where the setting screen including the multiple setting items related to the function corresponding to the job information is displayed, the function corresponding to the job information automatically based on the received job information without receiving a user's operation for executing the function corresponding to the job information on the setting screen including the multiple setting items related to the function corresponding to the job information displayed on the display unit of the image processing apparatus executing the function.

2. The image processing apparatus according to claim 1, wherein the home screen is a post-login screen displayed after login, based on user information included in the job information.

3. The image processing apparatus according to claim 1, wherein the setting screen that includes the multiple setting items related to the function corresponding to the job information is a screen in which a setting value included in the received job information is reflected.

4. The image processing apparatus according to claim 1, wherein user information is included in the job information, and login processing based on the user information is automatically executed without receiving a user's operation for the user to log in to the image processing apparatus on a screen for the user to log in to the image processing apparatus.

5. The image processing apparatus according to claim 1, wherein display control that automatically transitions from a login screen for a user to log in to the image processing apparatus to the home screen based on the reception of the job information is automatically executed without receiving a user's operation for the user to log in to the image processing apparatus, and wherein, in a case where the home screen is displayed on the display unit of the image processing apparatus on the login screen displayed on the display unit of the image processing apparatus, the display control that automatically transitions from the home screen to the setting screen including the multiple setting items related to the function corresponding to the job information is automatically executed without receiving a user's operation for transitioning to the setting screen including multiple setting items related to the function corresponding to the job information on the home screen displayed on the display unit of the image processing apparatus.

6. The image processing apparatus according to claim 5, wherein, in a case where displaying a message content is performed based on the user's login, the display control is performed such that the setting screen that includes the multiple setting items related to the function corresponding to the job information is not automatically transitioned when the job information is received.

7. The image processing apparatus according to claim 6, wherein the message content is a signage content acquired from an external server.

8. The image processing apparatus according to claim 7, wherein, in a case where the job information is not received from the external terminal, the setting screen including the multiple setting items related to the function corresponding to the job information is a setting screen displayed upon receiving the user's operation for selecting the function on the home screen of the image processing apparatus.

9. The image processing apparatus according to claim 1, wherein the display control for automatically transitioning from a login screen for a user to log in to the image processing apparatus to the home screen based on the reception of the job information is automatically executed without receiving a user's operation for the user to log in to the image processing apparatus on the login screen wherein, in a case where the home screen is displayed on a display unit of the image processing apparatus, the display control that automatically transitions from the home screen to the setting screen including the multiple setting items related to the function corresponding to the job information is automatically executed without receiving the user's operation for transitioning to the setting screen including the multiple setting items related to the function corresponding to the job information on the home screen displayed on the display unit of the image processing apparatus, wherein, in a case where the setting screen including the multiple setting items related to the function corresponding to the job information is displayed, a function corresponding to the job information based on the received job information is automatically executed without receiving a user's operation for executing the function corresponding to the job information on the setting screen including the multiple setting items related to the function corresponding to the job information displayed on the display unit of the image processing apparatus, and wherein display control that automatically transitions from the setting screen including the multiple setting items related to the function corresponding to the job information to a screen indicating that the function corresponding to the job information is executed is automatically executed without receiving a user's operation for transitioning to the screen indicating that the function corresponding to the job information is executed on the setting screen including the multiple setting items related to the function corresponding to the job information displayed on the display unit of the image processing apparatus.

10. The image processing apparatus according to claim 1, wherein the display control that automatically transitions from the home screen to the setting screen including the multiple setting items related to the function corresponding to the job information based on the reception of the job information is automatically executed without receiving a user's operation that automatically transitions to the setting screen including the multiple setting items related to the function corresponding to the job information on the home screen displayed on the display unit of the image processing apparatus, and wherein, in a case where the setting screen including the multiple setting items related to the function corresponding to the job information is displayed, display control that automatically transitions from the setting screen including the multiple setting items related to the function corresponding to the job information to a screen indicating that the function corresponding to the job information is being executed is automatically executed without receiving a user's operation for executing the function corresponding to the job information on the setting screen of the function corresponding to the job information displayed on the display unit of the image processing apparatus.

11. A method for an image processing apparatus, the method comprising:
receiving job information for giving an instruction to execute a function of the image processing apparatus, from among a plurality of functions including a copy function and a scanning function performable by the image processing apparatus, from an external terminal;
displaying a home screen including the copy function and the scan function displayed on a display unit of the image processing apparatus based on the received job information, and, in a case where the home screen is displayed, performing display control that automatically transitions from the home screen to a setting screen including multiple setting items related to the function corresponding to the job information without receiving a user's operation for transitioning to the setting screen including the multiple setting items related to the function corresponding to the job information on the home screen displayed on the display unit of the image processing apparatus; and
executing, in a case where the setting screen including the multiple setting items related to the function corresponding to the job information is displayed, the function corresponding to the job information automatically based on the received job information without receiving a user's operation for executing the function corresponding to the job information on the setting screen including the multiple setting items related to the function corresponding to the job information displayed on the display unit of the image processing apparatus executing the function.

12. A non-transitory computer-readable storage medium storing a program to cause a computer to perform a method for an image processing apparatus, the method comprising:
receiving job information for giving an instruction to execute a function of the image processing apparatus, from among a plurality of functions including a copy function and a scanning function performable by the image processing apparatus, from an external terminal;

displaying a home screen including the copy function and the scan function displayed on a display unit of the image processing apparatus based on the received job information, and, in a case where the home screen is displayed, performing display control that automatically transitions from the home screen to a setting screen including multiple setting items related to the function corresponding to the job information without receiving a user's operation for transitioning to the setting screen including the multiple setting items related to the function corresponding to the job information on the home screen displayed on the display unit of the image processing apparatus; and executing, in a case where the setting screen including the multiple setting items related to the function corresponding to the job information is displayed, the function corresponding to the job information automatically based on the received job information without receiving a user's operation for executing the function corresponding to the job information on the setting screen including the multiple setting items related to the function corresponding to the job information displayed on the display unit of the image processing apparatus executing the function.

* * * * *